US012811688B2

(12) United States Patent
Su et al.

(10) Patent No.: US 12,811,688 B2
(45) Date of Patent: Nov. 24, 2026

(54) OPTICAL/ELECTRICAL MODULE, COMMUNICATION METHOD, AND RELATED DEVICE

(71) Applicant: Huawei Technologies Co., Ltd., Shenzhen (CN)

(72) Inventors: Changzheng Su, Shenzhen (CN); Lei Zhao, Wuhan (CN); Yigang Zhou, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 162 days.

(21) Appl. No.: 18/416,436

(22) Filed: Jan. 18, 2024

(65) Prior Publication Data

US 2024/0154699 A1 May 9, 2024

Related U.S. Application Data

(63) Continuation of application No. PCT/CN2021/107037, filed on Jul. 19, 2021.

(51) Int. Cl.
*H04B 10/2507* (2013.01)
*H04B 10/40* (2013.01)

(52) U.S. Cl.
CPC ......... *H04B 10/2507* (2013.01); *H04B 10/40* (2013.01); *H04B 2210/006* (2013.01)

(58) Field of Classification Search
CPC . H04B 10/2543; H04B 10/2589; H04B 10/40
USPC ......................................... 398/139–140, 158
See application file for complete search history.

(56) References Cited

U.S. PATENT DOCUMENTS 9,998,303 B1 6/2018 Huss et al.
10,298,330 B2 5/2019 Tatum
11,212,005 B1 * 12/2021 Jopson ............... H04B 10/2589
2005/0196172 A1 * 9/2005 Moran et al. .......... H04B 10/00 398/140
2009/0103927 A1 * 4/2009 Cunningham et al. ...................... H04B 10/00 398/139

(Continued)

FOREIGN PATENT DOCUMENTS

CN 101662326 A 3/2010
CN 109218235 A 1/2019

(Continued)

*Primary Examiner* — Kenneth N Vanderpuye
(74) *Attorney, Agent, or Firm* — Slater Matsil, LLP

(57) ABSTRACT

An optical/electrical module includes an analog equalizer and an optical/electrical conversion unit. The analog equalizer is connected to the optical/electrical conversion unit. The analog equalizer is configured to: perform first analog signal equalization processing on a first electrical signal to obtain a second electrical signal, and send the second electrical signal to the optical/electrical conversion unit, or is configured to: receive a third electrical signal from the optical/electrical conversion unit, and perform second analog signal equalization processing on the third electrical signal to obtain a fourth electrical signal. The optical/electrical conversion unit is configured to: receive the second electrical signal from the analog equalizer and convert the second electrical signal into a first optical signal. According to embodiments of this application, equalization processing may be performed on an electrical signal in an analog domain.

13 Claims, 19 Drawing Sheets

(56) References Cited

U.S. PATENT DOCUMENTS

| | | | | |
|---|---|---|---|---|
| 2014/0255037 | A1 | 9/2014 | Shang | |
| 2021/0218472 | A1* | 7/2021 | Latchman .......... | H04B 10/2543 |

FOREIGN PATENT DOCUMENTS

| | | | |
|---|---|---|---|
| CN | 111224718 | A | 6/2020 |
| KR | 20200072922 | A | 6/2020 |
| KR | 20210028816 | A | 3/2021 |
| WO | 2018063227 | A1 | 4/2018 |
| WO | 2020070487 | A1 | 4/2020 |

* cited by examiner

Single bit response after a loss channel
(single bit response after a transmission loss)

Single bit response after 3 taps DFE
(single bit response after 3 taps DFE)

Active optical cable (e)

OPTICAL/ELECTRICAL MODULE, COMMUNICATION METHOD, AND RELATED DEVICE

CROSS-REFERENCE TO RELATED APPLICATIONS

This application is a continuation of International Application No. PCT/CN2021/107037, filed on Jul. 19, 2021, the disclosure of which is hereby incorporated by reference in its entirety.

TECHNICAL FIELD

Embodiments of this application relate to the field of communication technologies, and in particular, to an optical/electrical module, a communication method, and a related device.

BACKGROUND

A high performance computing (HPC) cluster usually includes a plurality of levels of switches, a plurality of servers, and the like. A high-speed cable or an optical fiber may be used for data transmission between the switch and the server or between the switches, to reduce a transmission latency.

As an amount of data to be transmitted increases, a data rate of a single port is increasingly high, and a mainstream server interface has evolved from 4×10 Gbps to 4×25 Gbps. A higher port rate indicates higher bandwidth and a larger loss coefficient for transmission of an electrical signal in a medium such as a printed circuit board (PCB) or a cable. Therefore, to resolve problems of signal attenuation and signal distortion that are caused in a transmission and optical/electrical conversion process of the electrical signal or an optical signal, a manner of adding one clock and data recovery (CDR) unit inside the switch, the server, or the like is mostly used in the market, to regenerate, re-time and re-amplify the received electrical signal.

However, although the additional CDR unit can resolve, to some extent, a problem caused by the large loss coefficient in the transmission process of the electrical signal, in a process of regenerating, re-timing, and re-amplifying the received electrical signal by using the CDR, a received high-speed electrical signal needs to be converted into a low-speed electrical signal through serial-to-parallel conversion and digital logic processing needs to be performed, and then the low-speed electrical signal is converted into a high-speed electrical signal through parallel-to-serial conversion. The digital logic processing, serial-to-parallel conversion, and the like cause a large latency. This in turn increases computing waiting time and reduces an overall computing capability of the HPC cluster. Therefore, how to reduce a transmission latency while ensuring signal transmission quality is an urgent problem to be resolved.

SUMMARY

Embodiments of this application provide an optical/electrical module, a communication method, and a related device, to reduce a transmission latency while ensuring signal transmission quality.

According to a first aspect, an embodiment of this application provides an optical/electrical module, including an analog equalizer and an optical/electrical conversion unit, where the analog equalizer is connected to the optical/electrical conversion unit. The analog equalizer is configured to: perform first analog signal equalization processing on a first electrical signal to obtain a second electrical signal, and send the second electrical signal to the optical/electrical conversion unit, or is configured to: receive a third electrical signal from the optical/electrical conversion unit, and perform second analog signal equalization processing on the third electrical signal to obtain a fourth electrical signal. The optical/electrical conversion unit is configured to: receive the second electrical signal from the analog equalizer and convert the second electrical signal into a first optical signal, or is configured to: convert a second optical signal into the third electrical signal and send the third electrical signal to the analog equalizer.

In this embodiment of this application, the analog equalizer may be used in the optical/electrical module to replace an original CDR. In this way, analog signal equalization processing may be directly performed, in an analog domain by using the analog equalizer, on an electrical signal that is input (for example, the first electrical signal, where the first electrical signal may be an electrical signal that is input to the analog equalizer when a local device sends a signal to another device, or for another example, the third electrical signal, where the third electrical signal may be an electrical signal that is received by the optical/electrical conversion unit of the local device and output to the analog equalizer when the another device sends a signal to the local device), to compensate for a loss generated in a transmission process of the electrical signal, and efficiently and quickly output an electrical signal (for example, the second electrical signal or the fourth electrical signal) with better quality and less inter-symbol interference. In this way, complex and time-consuming processing processes such as digital logic processing and serial-to-parallel conversion in the CDR are avoided while ensuring signal transmission quality, so that a signal transmission latency between communication devices is greatly reduced, thereby reducing computing waiting time of each communication device, and improving an overall computing capability.

In a possible implementation, the optical/electrical conversion unit includes a first optical/electrical converter, configured to: receive the second electrical signal from the analog equalizer and convert the second electrical signal into the first optical signal. The analog equalizer includes a transmit equalizer, configured to: perform the first analog signal equalization processing on the first electrical signal to obtain the second electrical signal, and send the second electrical signal to the first optical/electrical converter. In this embodiment of this application, when the local device sends a signal to the another device, a transmission loss exists in a transmission process before a to-be-sent electrical signal (for example, the first electrical signal) in the local device is input to the analog equalizer. Therefore, the electrical signal received by the analog equalizer usually has signal distortion and attenuation to some extent. Consequently, inter-symbol interference of the electrical signal is greater than inter-symbol interference of an electrical signal that is originally output. Based on this, in a sending direction, the analog equalizer in this application may perform equalization processing on the received electrical signal in the analog domain, to compensate for the loss in the previous transmission process of the electrical signal, and efficiently and quickly output an electrical signal (for example, the second electrical signal) with better quality and less inter-symbol interference to the optical/electrical conversion unit in the optical/electrical module. Then, the optical/electrical conversion unit may convert the received electrical signal into a corresponding optical signal, so that the signal is subsequently quickly transmitted to the another device through an optical fiber, thereby ensuring that the another device can quickly receive a signal with better quality. In some possible embodiments, as described above, because the electrical signal output by the analog equalizer needs to subsequently undergo electrical-to-optical conversion and then be transmitted to the another device, the analog equalizer may further perform pre-equalization processing on the electrical signal based on a transmission loss that may be generated in a subsequent transmission process, to compensate for the loss in the subsequent transmission process, and further ensure quality and the like of a signal received by the another device. This is not specifically limited in this embodiment of this application.

In a possible implementation, the transmit equalizer includes at least one of a first continuous time linear equalizer CTLE, a first low frequency equalizer LFEQ, and a first level mismatch compensation circuit. In this way, in the sending direction, the analog equalizer may compensate a high-frequency part and/or a low-frequency part of the received signal (for example, the first electrical signal) to be sent by the local device, to reduce inter-symbol interference of the high-frequency part and/or the low-frequency part of the signal, so that compared with the received electrical signal, a high-quality electrical signal with less inter-symbol interference can be obtained and output.

In a possible implementation, the transmit equalizer includes the first CTLE, the first LFEQ, and the first level mismatch compensation circuit that are connected in series. In this embodiment of this application, all frequency bands of the signal may be compensated by using the analog equalizer, to obtain a higher-quality electrical signal, thereby more reliably ensuring the quality of the signal received by the another device.

In a possible implementation, the optical/electrical conversion unit includes a second optical/electrical converter, configured to: convert the second optical signal into the third electrical signal and send the third electrical signal to the analog equalizer. The analog equalizer includes a receive equalizer, configured to: receive the third electrical signal from the second optical/electrical converter, and perform the second analog signal equalization processing on the third electrical signal to obtain the fourth electrical signal. In this embodiment of this application, when the local device receives a signal sent by the another device, the optical/electrical conversion unit in the local device may receive an optical signal output by the another device, convert the optical signal into a corresponding electrical signal (for example, the third electrical signal), and output the corresponding electrical signal to the analog equalizer. Correspondingly, a loss exists in a transmission process before the electrical signal is input to the analog equalizer. Based on this, in a receiving direction, the analog equalizer in this application may perform equalization processing on the received electrical signal in the analog domain, to compensate for the loss in the previous transmission process of the electrical signal, and efficiently and quickly output an electrical signal (for example, the fourth electrical signal) with better quality and less inter-symbol interference, thereby ensuring quality of an electrical signal that is finally received by the local device and that is used to perform corresponding computing, analysis, or the like.

In a possible implementation, the receive equalizer includes at least one of a second CTLE, a second LFEQ, and a second level mismatch compensation circuit. In this way, in the receiving direction, the analog equalizer may compensate a high-frequency part and/or a low-frequency part of the received signal (for example, the third electrical signal) to be sent by the another device, to reduce inter-symbol interference of the high-frequency part and/or the low-frequency part of the signal, so that compared with the received electrical signal, a high-quality electrical signal with less inter-symbol interference can be obtained and output.

In a possible implementation, the receive equalizer includes the second CTLE, the second LFEQ, and the second level mismatch compensation circuit that are connected in series. In this embodiment of this application, all frequency bands of the signal may be compensated by using the analog equalizer, to obtain a higher-quality electrical signal, thereby more reliably ensuring the quality of the signal received by the local device.

According to a second aspect, an embodiment of this application provides a communication device, including a digital signal interface unit and the optical/electrical module according to any implementation of the first aspect. The digital signal interface unit is configured to: receive a first digital electrical signal from a processing device, convert the first digital electrical signal into the first electrical signal, and send the first electrical signal to the analog equalizer, or is configured to: receive the fourth electrical signal from the analog equalizer, convert the fourth electrical signal into a second digital electrical signal, and send the second digital electrical signal to the processing device.

In this embodiment of this application, when the local device sends a signal to another device, the digital signal interface unit in the local device may convert a digital electrical signal output by the processing device (for example, a central processing unit (CPU) or a graphics processing unit (GPU)) into an analog electrical signal (for example, the first electrical signal), and input the analog electrical signal to the analog equalizer, so that subsequently, equalization processing may be directly performed on the analog electrical signal in an analog domain by using the analog equalizer, to efficiently and quickly obtain and output a high-quality analog electrical signal (for example, the second electrical signal) with less inter-symbol interference, to ensure quality of the signal received by the another device, and greatly reduce a signal transmission latency. Alternatively, when the local device receives a signal sent by the another device, based on a received analog electrical signal (for example, the third electrical signal) sent by the optical/electrical conversion unit, the analog equalizer directly performs equalization processing on the analog electrical signal in the analog domain, to efficiently and quickly obtain and output a high-quality analog electrical signal (for example, the fourth electrical signal) with less inter-symbol interference to the digital signal interface unit, and then the digital signal interface unit may convert the analog electrical signal into a corresponding high-quality digital electrical signal and output the high-quality digital electrical signal to the processing device. Therefore, it is ensured that the processing device may subsequently perform reliable and accurate computing, analysis, or the like based on the received digital electrical signal, and time for the local device to wait for receiving the signal is greatly reduced.

In a possible implementation, the device further includes a high-speed passive component, configured to connect the digital signal interface unit to the analog equalizer. In this embodiment of this application, the digital signal interface unit and the equalizer in this application may be further connected by using the high-speed passive component, to provide a low-loss high-speed transmission channel for the signal, thereby reducing a transmission latency while further reducing inter-symbol interference and ensuring signal quality.

In a possible implementation, the high-speed passive component includes a first high-speed connector, a second high-speed connector, and a high-speed cable, the first high-speed connector and the second high-speed connector are connected through the high-speed cable, the first high-speed connector is connected to the digital signal interface unit, and the second high-speed connector is connected to the analog equalizer. In this embodiment of this application, if there is a long distance between the digital signal interface unit in the device and the analog equalizer (in other words, the optical/electrical module), and a rate of a transmitted signal is high, a severe transmission loss and a large transmission latency are generated when the signal is transmitted in this period. Based on this, the high-speed passive component in this embodiment of this application may include two high-speed connectors and a segment of high-speed cable configured to connect the two high-speed connectors. The two high-speed connectors are respectively connected to the digital signal interface unit and the analog equalizer, and then the low-loss high-speed transmission channel is provided through the high-speed cable in the middle, to ensure that the signal transmission loss and the transmission latency are reduced when the signal is transmitted over a long distance in the device. In this way, it can be ensured that subsequently, the analog equalizer can quickly and effectively compensate for the transmission loss of the electrical signal.

In a possible implementation, the high-speed passive component includes a first high-speed connector, and the first high-speed connector is connected between the digital signal interface unit and the analog equalizer. The device further includes a first hollow-core optical fiber and a hollow-core optical fiber connector. The first hollow-core optical fiber is connected to the optical/electrical conversion unit, and is configured to: send the first optical signal or receive the second optical signal. The hollow-core optical fiber connector is configured to: send the first optical signal to a second hollow-core optical fiber or receive the second optical signal from the second hollow-core optical fiber. In this embodiment of this application, the local device may be connected to the another device through a hollow-core optical fiber (for example, the second hollow-core optical fiber), to reduce the signal transmission latency between the devices. In addition, the high-speed passive component in the local device may include only one high-speed connector configured to be connected between the digital signal interface unit and the analog equalizer. In this way, the analog equalizer (in other words, the optical/electrical module) is located at a position close to the digital signal interface unit. Correspondingly, the optical/electrical conversion unit in the optical/electrical module is located at a position far away from the hollow-core optical fiber between the devices. To be specific, an optical signal output by the optical/electrical conversion unit can be transmitted to the hollow-core optical fiber between the devices only after a long distance. Alternatively, an optical signal output by the hollow-core optical fiber between the devices can be transmitted to the optical/electrical conversion unit only after a long distance. Based on this, the local device may further include a segment of hollow-core optical fiber (for example, the first hollow-core optical fiber) connected to the optical/electrical conversion unit, and a connector configured to connect the hollow-core optical fiber in the device and the hollow-core optical fiber between the devices. High-speed optical signal transmission may be performed through the hollow-core optical fibers inside and outside the device by using the connector.

According to a third aspect, an embodiment of this application provides an active optical cable, including at least two optical/electrical modules according to any implementation of the first aspect and a hollow-core optical fiber, where the at least two optical/electrical modules are connected through the hollow-core optical fiber.

According to a fourth aspect, an embodiment of this application provides a communication system, including a plurality of communication devices, where the plurality of communication devices are connected through the active optical cable according to the third aspect. In a possible implementation, the plurality of communication devices include at least one device according to any implementation of the second aspect.

According to a fifth aspect, an embodiment of this application provides a communication method in which an optical/electrical module is used, including: performing first analog signal equalization processing on a first electrical signal by using an analog equalizer in the optical/electrical module to obtain a second electrical signal, and sending the second electrical signal to an optical/electrical conversion unit, or receiving a third electrical signal from the optical/electrical conversion unit by using the analog equalizer, and performing second analog signal equalization processing on the third electrical signal to obtain a fourth electrical signal; and receiving the second electrical signal from the analog equalizer by using the optical/electrical conversion unit in the optical/electrical module, and converting the second electrical signal into a first optical signal, or converting a second optical signal into the third electrical signal by using the optical/electrical conversion unit, and sending the third electrical signal to the analog equalizer.

According to a sixth aspect, an embodiment of this application provides a computer-readable storage medium. The computer-readable storage medium stores a computer program. When the computer program is executed by a processor, a procedure of the communication method in which an optical/electrical module is used according to the fifth aspect is implemented. There may be one or more processors.

According to a seventh aspect, an embodiment of this application provides a computer program. The computer program includes instructions. When the computer program is executed by a computer, the computer is enabled to perform a procedure of the communication method in which an optical/electrical module is used according to the fifth aspect.

According to an eighth aspect, an embodiment of this application provides a chip. The chip includes a processor and a communication interface. The processor is configured to invoke instructions from the communication interface and run the instructions. When the processor executes the instructions, the chip is enabled to perform a procedure of the communication method in which an optical/electrical module is used according to the fifth aspect.

According to a ninth aspect, an embodiment of this application provides a chip system. The chip system may include the optical/electrical module according to any implementation of the first aspect, and is configured to implement a function in a procedure of the communication method in which an optical/electrical module is used according to the fifth aspect. In a possible design, the chip system further includes a memory. The memory is configured to store program instructions and data that are necessary for the communication method. The chip system may include a chip, or may include a chip and another discrete device.

BRIEF DESCRIPTION OF THE DRAWINGS

To describe technical solutions in embodiments of this application more clearly, the following describes the accompanying drawings for describing embodiments of this application or the background.

DETAILED DESCRIPTION OF ILLUSTRATIVE EMBODIMENTS

The following describes embodiments of this application with reference to the accompanying drawings in embodiments of this application. In the specification, claims, and accompanying drawings of this application, the terms "first", "second", "third", "fourth", "1$^{st}$", "2$^{nd}$", "3$^{rd}$", "4$^{th}$", and the like are intended to distinguish between different objects but do not indicate a particular order. In addition, the terms "including", "having", and any other variants thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular feature, structure, or characteristic described with reference to the embodiment may be included in at least one embodiment of this application. The phrase shown in various locations in the specification may neither necessarily mean a same embodiment, nor mean an independent or optional embodiment exclusive from another embodiment. It is explicitly and implicitly understood by persons skilled in the art that embodiments described in the specification may be combined with another embodiment.

Some terms in this application are first described, to help persons skilled in the art have a better understanding.

(1) High performance computing (HPC) is a computing system and environment that usually use a plurality of processors (as a part of a single server) or a plurality of servers (as a single computing resource operation) in a cluster and a switching network thereof.

Figure 1:
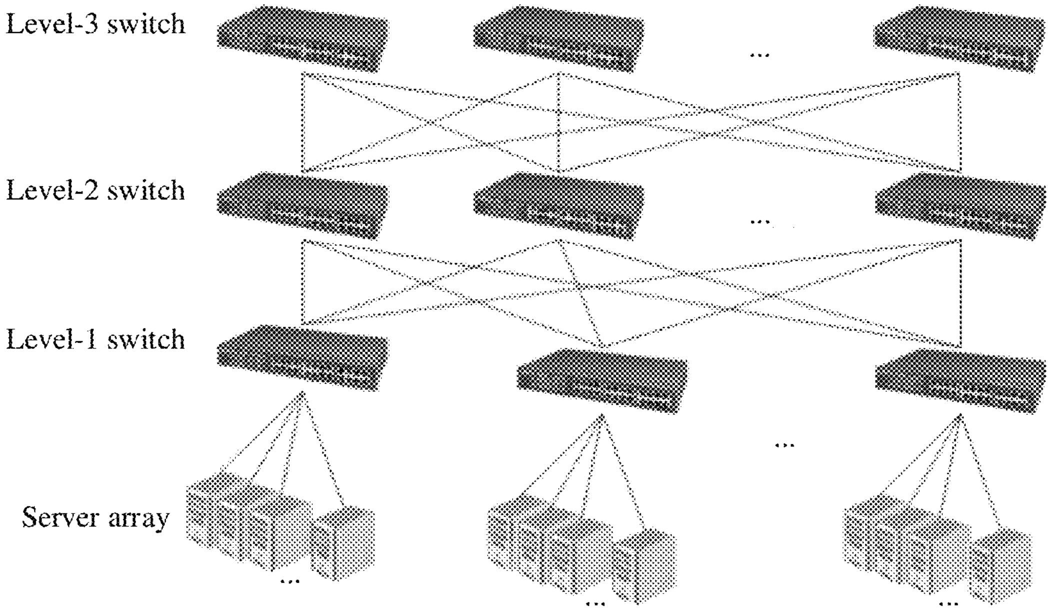
FIG. 1 is a schematic diagram of an architecture of a high performance computing cluster according to an embodiment of this application.

FIG. 1 is a schematic diagram of an architecture of a high performance computing cluster according to an embodiment of this application. As shown in FIG. 1, a large-scale high performance computing cluster may include a plurality of levels of switches (for example, a level-1 switch, a level-2 switch, and a level-3 switch, where each level may include a plurality of switches) and a plurality of server arrays, and each server array may include a plurality of servers. It should be understood that FIG. 1 is merely an example, and there may be different configurations based on a scale of the HPC cluster. For example, a small-scale HPC cluster may use only one level of switch, a medium-scale HPC cluster may use two levels of switches, and a large-scale HPC cluster may use three or more levels of switches for data exchange.

To reduce a latency in transmitting data (in other words, a signal) between different servers or switches, reduce computing waiting time, and improve an overall computing capability, an HPC system usually uses a high performance network interconnection, for example, uses a low-latency "infiniband" (IB) switch. "Infiniband" is a computer network communication standard for high performance computing. "Infiniband" has a very high throughput and a very low latency, and is for a data interconnection between computers. Infiniband is also used as a direct or switched interconnection between the server and a storage system and an interconnection between storage systems. A high-speed cable or an optical fiber may be used for data transmission between the infiniband switch and the server or between infiniband switches, to further reduce a transmission latency.

Figure 2:
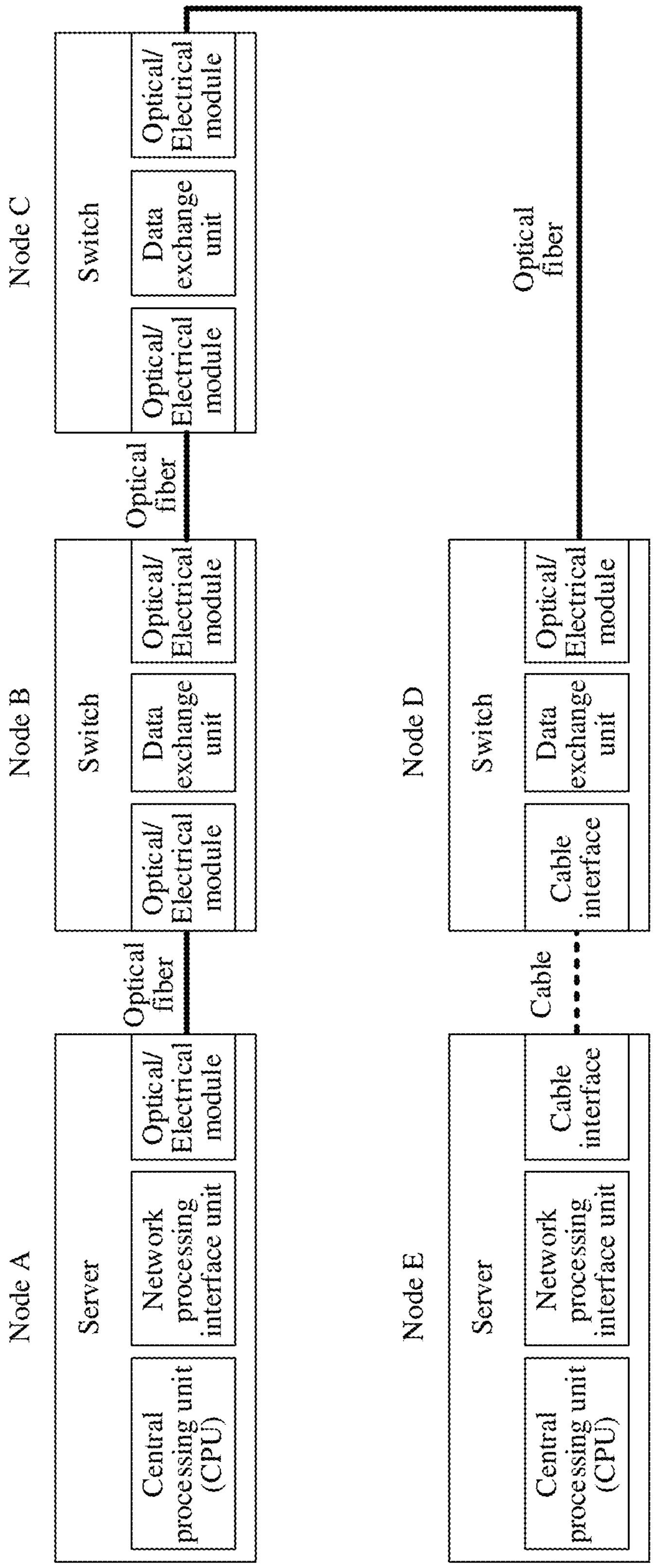
FIG. 2 is a schematic diagram of an HPC data transmission link according to an embodiment of this application.

FIG. 2 is a schematic diagram of an HPC data transmission link according to an embodiment of this application. As shown in FIG. 2, a node A and a node E may be servers, and a node B, a node C, and a node D may be switches. It should be noted that, because a loss coefficient of a high-rate electrical signal transmitted in a cable is large, when a distance between two nodes exceeds 5 m, an optical fiber is usually needed for transmission, and one optical/electrical module (for example, optical/electrical modules in the nodes A, B, C, and D in FIG. 2) is needed for optical/electrical conversion. In an actual HPC cluster, a distance between switch nodes usually exceeds 5 m. Therefore, only the optical fiber can be used to transmit a signal between most of the switch nodes. A signal rate and a distance between nodes may be comprehensively considered between a switch and a server, and the optical fiber or the cable can be used to transmit a signal. As shown in FIG. 2, a link between the node A and the node B is shown as an optical fiber for signal transmission, and a link between the node D and the node E is shown as a cable for signal transmission. This is not specifically limited in this embodiment of this application.

As shown in FIG. 2, one signal is sent from the node A, passes through the node B, the node C, and the node D, and then arrives at the node E, where a major latency may include a signal processing latency of a network processing interface unit of the node A, a link transmission latency between the node A and the node B, a signal processing latency of a data exchange unit of the node B, a link transmission latency between the node B and the node C, a signal processing latency of a data exchange unit of the node C, a link transmission latency between the node C and the node D, a signal processing latency of a data exchange unit of the node D, a link transmission latency between the node D and the node E, and a signal processing latency of a network processing interface unit of the node E.

(2) An insertion loss is generally a loss of energy or a gain when some devices or branch circuits (a filter, an impedance matcher, an adapter, or the like) are added to a circuit. An insertion loss during transmission of an optical signal between two nodes may be generally divided into three parts. The node A and the node B in FIG. 2 are used as examples. An insertion loss during transmission of an optical signal between the node A and the node B may include an insertion loss at a joint between the optical/electrical module of the node A and the optical fiber (where generally, the optical/electrical module may be connected to the optical fiber by using a device, for example, the adapter), an insertion loss (in other words, a transmission loss) inside the optical fiber during optical fiber transmission, and an insertion loss at a joint between the optical fiber and the optical/electrical module of the node B.

Figure 3:
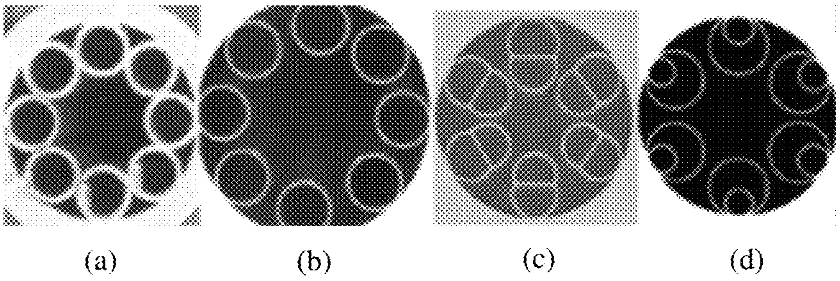
FIG. 3 is a schematic diagram of a group of hollow-core optical fibers according to an embodiment of this application.

(3) A principle of a hollow-core optical fiber is different from a total reflection principle of a conventional optical fiber waveguide to guide light. A fiber core of the hollow-core optical fiber is air. This brings benefits such as a low latency, ultra-low nonlinearity, and low dispersion. However, the hollow-core optical fiber has a problem of a very large insertion loss at the beginning. To overcome the problem of the large insertion loss of the hollow-core optical fiber, a variety of hollow-core optical fibers based on an anti-resonance principle are proposed in the market. To be specific, based on an anti-resonance mechanism of a resonant cavity in a cladding, light is bound in an air hole that is used as a core. FIG. 3 is a schematic diagram of a group of hollow-core optical fibers according to an embodiment of this application. As shown in (a), (b), (c) and (d) in FIG. 3, the hollow-core optical fiber based on the anti-resonance principle mainly uses back-and-forth coherent reflection of light between tubular glass films in the optical fiber to restrict the light near an air core and transmit the light along an axis. A processing and manufacturing technology of the hollow-core optical fiber is extremely complex, and a diameter (um level) and a film thickness (nm level) of tubular glass in the hollow-core optical fiber usually need to be accurately controlled during a processing and manufacturing process. Currently, in the market, only a length of a single piece of anti-resonance hollow-core optical fiber can reach several kilometers. A typical value of an actual insertion loss coefficient of the anti-resonance hollow-core optical fiber ranges from 1 dB/km to 10 dB/km, and is still far greater than an insertion loss coefficient of about 0.2 dB/km of an existing solid-core single mode fiber. As described above, the existing anti-resonance hollow-core optical fiber still has disadvantages such as a short length and a large insertion loss. This makes it difficult to use the anti-resonance hollow-core optical fiber on a large scale.

(4) A clock and data recovery (CDR) is mainly used to keep a signal of a receive end consistent with a signal of a transmit end. When an electrical signal or an optical signal is transmitted to a specific distance, long-distance transmission is usually performed, and a waveform of the electrical signal or the optical signal has distortion to some extent. Therefore, a signal received by the receive end is a pulse signal of different lengths, which cannot meet an actual requirement. In the foregoing case, signal regeneration, re-amplification, re-timing, and the like may be performed by using the CDR, to obtain a signal that meets the requirement. Generally, most of optical/electrical modules that use the CDR are optical/electrical modules with high-rate and long-distance transmission.

As described above, with rapid development of an information society, an amount of data to be transmitted increases, a data rate of a single port is increasingly high, and a mainstream server interface has evolved from 4×10 Gbps to 4×25 Gbps. A higher port rate indicates larger bandwidth, and a larger loss coefficient for transmitting an electrical signal in a medium such as a printed circuit board (PCB) or a cable. Therefore, a series of processing usually needs to be performed on a signal received by the node or a signal to be sent by the node, so that an inevitable loss of the signal in a transmission process is compensated for, to ensure signal quality and ensure that the node can perform reliable and accurate computing and the like based on the received signal.

In conclusion, to facilitate understanding of embodiments of this application, a technical problem specifically to be resolved in this application is further analyzed and proposed. In a conventional technology, to resolve a problem of a severe signal loss generated when a transmission rate is increasingly high, a plurality of technical solutions are included. The following exemplifies the following common solutions.

Figure 4:
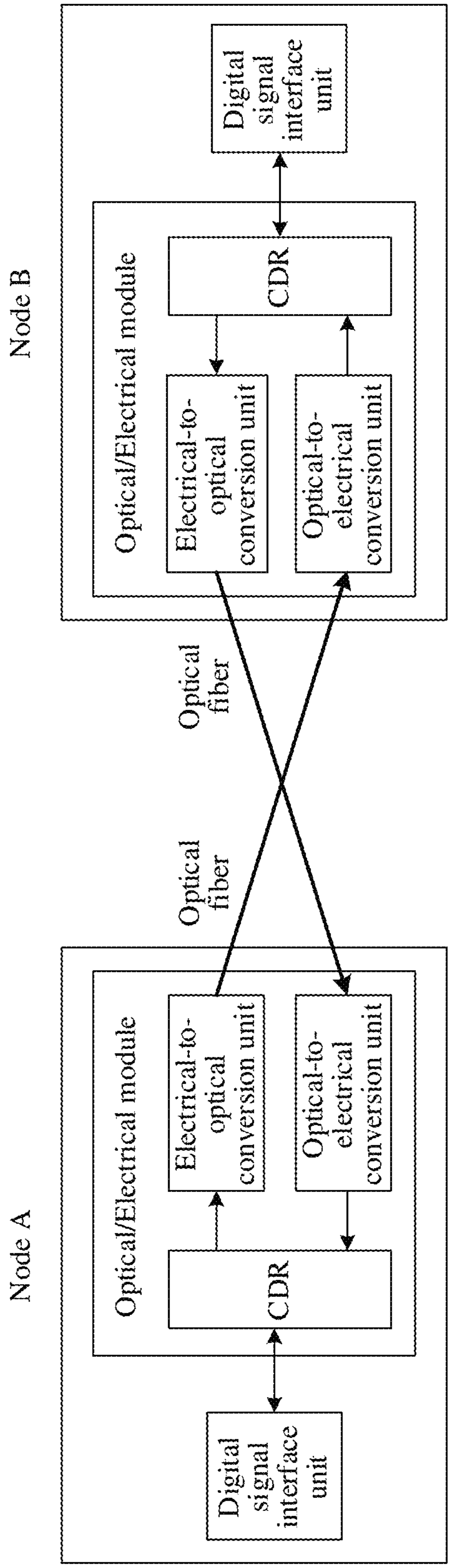
FIG. 4 is a schematic diagram of a data link between nodes.

FIG. 4 is a schematic diagram of a data link between nodes. As shown in FIG. 4, a node A and a node B may be two devices that transmit data through an optical fiber in an HPC cluster. Each of the node A and the node B may include a digital signal interface unit and an optical/electrical module. Optionally, the digital signal interface unit and the optical/electrical module may be deployed on a PCB. As shown in FIG. 4, each of the optical/electrical modules of the node A and the node B may include an electrical-to-optical conversion unit, an optical-to-electrical conversion unit, and a CDR.

Optionally, device types of the node A and the node B shown in FIG. 4 may include but are not limited to a server, a switch, a storage resource pool, a random access memory resource pool, and the like. Correspondingly, the digital signal interface units in the node A and the node B may include but are not limited to a network processing interface unit, a data exchange unit, a storage interface unit, a random access memory interface unit, and the like. As described above, the digital signal interface unit may be configured to implement logic processing on a digital signal, and output or receive one lane or more lanes of electrical signals. The electrical signal may be a high-speed electrical signal, and is used to transmit data between nodes.

As shown in FIG. 4, an example in which the node A sends a signal to the node B is used. The electrical-to-optical conversion unit in the node A may be connected to the optical-to-electrical conversion unit in the node B through an optical fiber. In this way, an electrical signal output by the digital signal interface unit of the node A may be converted into a corresponding optical signal by using the electrical-to-optical conversion unit of the node A, and transmitted to the optical-to-electrical conversion unit of the node B through the optical fiber, and then the optical signal is converted into a corresponding electrical signal by using the optical-to-electrical conversion unit of the node B, and the electrical signal is input to the digital signal interface unit of the node B. Finally, the digital signal interface unit of the node B may perform a series of logic computing and the like on the electrical signal that is input. Correspondingly, as shown in FIG. 4, the electrical-to-optical conversion unit in the node B may be connected to the optical-to-electrical conversion unit in the node A through an optical fiber, and the node B sends a signal to the node A in a same way. Details are not described herein again.

With reference to a node structure shown in FIG. 4, it can be learned that, when a loss coefficient is large in the foregoing case, the node A is used as an example, and an electrical signal output by the network processing interface unit of the node A has attenuation and distortion to some extent because of a loss (in other words, aberration, where for example, an amplitude, a frequency, and a phase of a signal change, and generally, the loss may mean a decrease in the signal amplitude) generated in transmission on a medium such as the PCB. Therefore, it is difficult to directly drive the electrical-to-optical conversion unit of the node A. Correspondingly, an electrical signal output by the optical-to-electrical conversion unit of the node A also has a loss in a transmission process, causing signal attenuation and distortion. Therefore, the network processing interface unit of the node A cannot accurately receive the electrical signal output by the optical-to-electrical conversion unit of the node A. In addition, usually, when an optical signal is transmitted in the optical fiber, attenuation and distortion also exist to some extent, attenuation and distortion also exist in a process in which the optical-to-electrical conversion unit and the electrical-to-optical conversion unit perform mutual conversion between the optical signal and the electrical signal, and the like.

In this way, to resolve problems of signal attenuation and signal distortion caused during transmission and optical/electrical conversion of the electrical signal or the optical signal, as shown in FIG. 4, one CDR may be added to each of the optical/electrical modules of the node A and the node B, to regenerate, re-time, and re-amplify the received electrical signal, and then input the received electrical signal to the electrical-to-optical conversion unit or the digital signal interface unit. An example in which the node A sends the signal to the node B is used. The added CDR can ensure, as much as possible, that the electrical signal that is finally input to the digital signal interface unit of the node B is consistent with the electrical signal that is initially output by the digital signal interface unit of the node A.

Further, as shown in FIG. 4, a sum of all latencies of a signal output from a digital signal interface unit of one node to a data interface unit of another node may be defined as a link transmission latency between two nodes (in other words, between two communication devices) in this embodiment of this application. The following still uses an example in which the signal is transmitted from the node A to the node B. A link transmission latency between the node A and the node B includes the following.

(1) Latency (that is, a latency needed for signal regeneration, re-timing, and re-amplification after the CDR of the node A receives a signal sent by the digital signal interface unit) in a sending direction of the CDR of the node A and latency (that is, a latency needed for signal regeneration, re-timing, and re-amplification after the CDR of the node B receives a signal sent by the optical-to-electrical conversion unit) in a receiving direction of the CDR of the node B. Optionally, based on different rates, different coding formats, and different design schemes, generally, a sum of the foregoing two latencies ranges from tens of nanoseconds (ns) to hundreds of nanoseconds, and a typical value is 100 ns.

(2) Optical fiber transmission latency of an output from the optical/electrical module of the node A to the optical/electrical module of the node B. For example, if a currently used optical fiber is a solid-core single mode fiber (SMF) or multi-mode fiber (MMF), a transmission latency coefficient of the optical fiber is about 4.8 ns/m. For example, if the optical fiber is 50 m long, a total transmission latency of the optical fiber is 240 ns.

(3) Routing latencies of the electrical signals of the node A and the node B on respective PCBs, for example, a routing latency of an electrical signal output from the digital signal interface unit of the node A to the CDR of the node A or a routing latency of an electrical signal output from the CDR of the node A to the electrical-to-optical conversion unit of the node A. Details are not described herein again. Due to different dielectric constants of PCB materials, a PCB transmission latency coefficient ranges from 5 ns/m to 10 ns/m. However, because a PCB routing length is short, the routing length at each node is usually less than 0.5 m. To be specific, a sum of the routing latencies of the electrical signals of the node A and the node B is usually less than 10 ns. It is clear that compared with the CDR latency and the optical fiber transmission latency, the routing latency of the electrical signal on the PCB is a very small value.

Further, when a port rate continues to increase, for example, increase to 4×50 Gbps, a 4 levels pulse amplitude modulation (PAM4) coding format begins to be used in the industry to replace a non-return-to-zero (NRZ) coding format, to reduce a baud rate of a signal, thereby avoiding an increase that is in a loss coefficient of transmission on media such as the PCB and a cable and that is caused by an increase in signal bandwidth. However, because a multi-level signal is more sensitive to signal distortion and can tolerate less signal attenuation, when the digital signal interface unit is far away from the optical/electrical module, to avoid signal distortion and excessive signal attenuation, another CDR unit needs to be added to a main board PCB.

Figure 5:
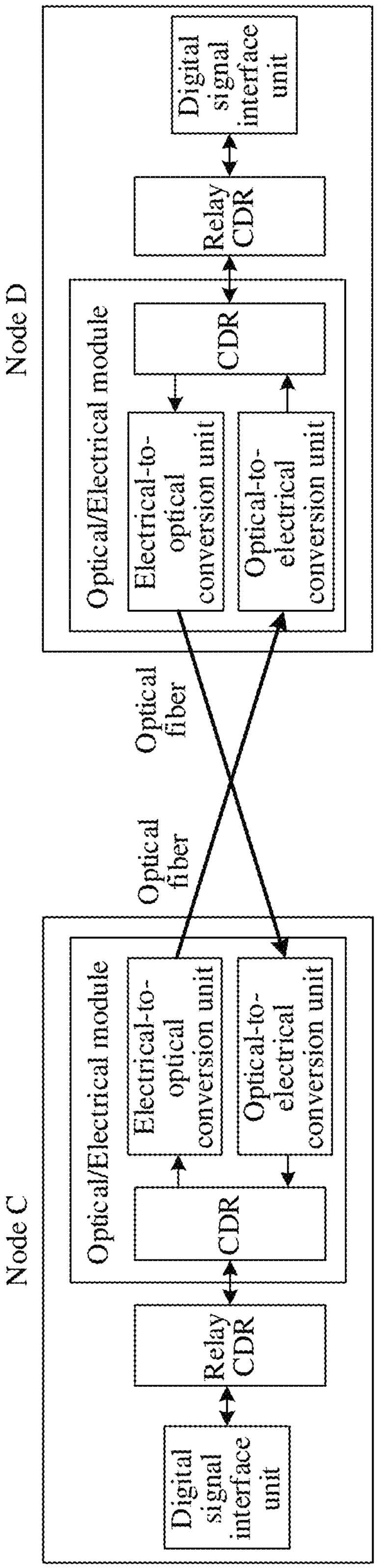
FIG. 5 is a schematic diagram of another data link between nodes.

FIG. 5 is a schematic diagram of another data link between nodes. For descriptions of FIG. 5, refer to the descriptions in FIG. 4. Details are not described herein again. For example, when the port rate continues to increase to 4×50 Gbps, in comparison with FIG. 4, a relay CDR is added to each of a node C and a node D in FIG. 5. Two ends of the relay CDR are respectively connected to a digital signal interface unit and a CDR in an optical/electrical module. Similarly, the following uses an example in which data is transmitted from the node C to the node D. A link transmission latency between the node C and the node D includes the following.

(1) Latency in a sending direction of a CDR in an optical/electrical module of the node C and latency in a receiving direction of a CDR in an optical/electrical module of the node D. Optionally, based on different rates, different coding formats, and different design schemes, generally, a sum of the foregoing two latencies ranges from tens of nanoseconds to hundreds of nanoseconds, and a typical value is 100 ns.

(2) Latency in a sending direction of the relay CDR of the node C and latency in a receiving direction of the relay CDR of the node D. Optionally, based on different rates, different coding formats, and different design schemes, generally, a sum of the foregoing two latencies ranges from tens of nanoseconds to hundreds of nanoseconds, and a typical value is 100 ns.

(3) Optical fiber transmission latency of an output from the optical/electrical module of the node C to the optical/electrical module of the node D. For example, if a currently used optical fiber is still a solid-core SMF or MMF, a transmission latency coefficient of the optical fiber is 4.8 ns/m. For example, if the optical fiber is 50 m, a total transmission latency of the optical fiber is 240 ns.

(4) Routing latencies of electrical signals of the node C and the node D on respective PCBs. Similarly, a sum of the routing latencies of the electrical signals of the node C and the node D is generally less than 10 ns. It is clear that compared with the CDR latency in the optical/electrical module, the relay CDR latency, and the optical fiber transmission latency, the routing latency of the electrical signal on the PCB is a very small value.

It should be noted that FIG. 4 and FIG. 5 are merely examples for describing a possible data link between nodes. In some possible implementations, each node may include more or fewer components than those in FIG. 4 or FIG. 5, even different components, or the like. This is not specifically limited in embodiments of this application.

In conclusion, although the additional CDR can resolve problems caused by losses of the electrical signal and the optical signal due to transmission and optical/electrical conversion to some extent, in a process of regenerating, re-timing, and re-amplifying the received electrical signal by using the CDR, a received high-speed electrical signal needs to be converted into a low-speed electrical signal through serial-to-parallel conversion and digital logic processing needs to be performed, and then the low-speed electrical signal is converted into a high-speed electrical signal through parallel-to-serial conversion. Operations such as the digital logic processing and the serial-to-parallel conversion are complex and time-consuming, and bring a large latency. The link between the node C and the node D in the foregoing figure is used as an example. The optical fiber transmission latency is 240 ns, the CDR latency in the optical/electrical module is 100 ns, the relay CDR latency on a main board is 100 ns, the PCB routing latency is about 10 ns, and a total latency is 450 ns. A sum (200 ns) of the CDR latency in the optical/electrical module and the relay CDR latency is even equivalent to the transmission latency of a 50-meter-long optical fiber, and almost occupies half of the total latency. This greatly increases the transmission latency of the entire link, that is, increases computing waiting time. In this way, an overall computing capability of an HPC cluster is reduced.

Therefore, to resolve a problem that an actual service requirement is not met in a conventional technology, the technical problem to be actually resolved in this application includes the following aspects: Through proper device selection and layout, a signal transmission latency between communication devices is reduced while ensuring signal transmission quality, to reduce computing waiting time and improve an overall computing capability. Optionally, the communication devices include but are not limited to any two devices such as a server, a switch, a storage resource pool, and a random access memory resource pool. For example, the signal transmission latency may be between two servers, between two switches, between a server and a switch, between a server and a random access memory resource pool, between a switch and a storage resource pool, or the like. This is not specifically limited in embodiments of this application.

Figure 6:
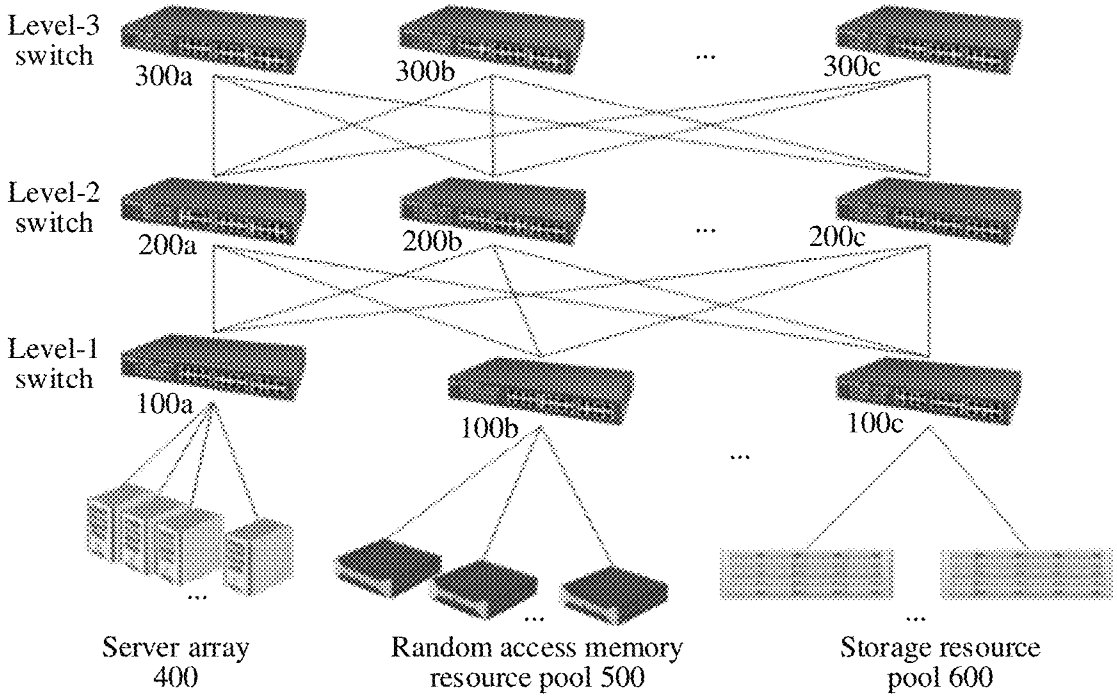
FIG. 6 is a schematic diagram of a system architecture according to an embodiment of this application.

FIG. 6 is a schematic diagram of a system architecture according to an embodiment of this application. The technical solutions in embodiments of this application may be specifically implemented in the system architecture shown as an example in FIG. 6 or a similar system architecture. As shown in FIG. 6, the system architecture may include one HPC cluster. The HPC cluster may include a plurality of nodes, and may specifically include a plurality of level-1 switches (such as switches 100*a*, 100*b*, and 100*c*), a plurality of level-2 switches (such as switches 200*a*, 200*b*, and 200*c*), a plurality of level-3 switches (such as switches 300*a*, 300*b*, and 300*c*), a server array 400, a random access memory resource pool 500, a storage resource pool 600, and the like. The server array 400 may include a plurality of servers, the random access memory resource pool 500 may include a plurality of random access memories, the storage resource pool 600 may include a plurality of memories, and the like. Details are not described herein again. As shown in FIG. 6, any device among the plurality of switches, the server array 400, the random access memory resource pool 500, and the storage resource pool 600 may be connected through an optical fiber for signal transmission.

Each of the plurality of switches, the server array 400, the random access memory resource pool 500, and the storage resource pool 600 may include a digital signal interface unit and an optical/electrical module. In this embodiment of this application, an analog equalizer may be used in each optical/electrical module in the plurality of switches, the server array 400, the random access memory resource pool 500, and the storage resource pool 600 to replace an original CDR. In this way, each node may directly perform analog signal equalization processing on a received high-speed electrical signal (which may be an electrical signal output by the digital signal interface unit of the node to the analog equalizer, or an electrical signal output by an optical/electrical conversion unit of the node to the analog equalizer after conversion of an optical signal output by another node) in an analog domain by using the analog equalizer in the node, to compensate for a loss generated in a transmission process of the received high-speed electrical signal, thereby efficiently and quickly outputting an electrical signal with better quality. This avoids complex and time-consuming processing processes such as digital logic processing and serial-to-parallel conversion while ensuring signal transmission quality, and greatly reduces a signal transmission latency, thereby reducing computing waiting time of each node, and improving an overall computing capability of the HPC cluster.

In an HPC cluster scenario, generally, a baud rate of an electrical signal is greater than a baud rate (Baud/s) of 25 G. For example, if an NRZ coding format is used, a rate of each lane of electrical signal is greater than 25 Gbps, if a PAM4 coding format is used, a rate of each lane of electrical signal is greater than 50 Gbps, if a PAM8 coding format is used, a rate of each lane of high-speed electrical signal is greater than 75 Gbps, and the like. A rate of another coding format is deduced by analogy, and details are not described herein again. As described above, the analog equalizer in this embodiment of this application may be used in processing a high-speed electrical signal (for example, a high-speed electrical signal whose baud rate is greater than a baud rate of 25 G, or even greater than a baud rate of 50 G) at a very high rate.

Further, the foregoing optical fiber may be a solid-core optical fiber, or may be a hollow-core optical fiber. Preferably, the hollow-core optical fiber may be used to replace the solid-core optical fiber, for example, an SMF or an MMF.

First, because a refractive index of a fiber core material used in the solid-core optical fiber is about 1.45, and the hollow-core optical fiber uses air as a transmission medium whose refractive index is about 1, a transmission speed of an optical signal in the hollow-core optical fiber is higher than a transmission speed in the solid-core optical fiber, where the transmission speeds respectively are 300,000 km/s and 207,000 km/s. Latencies needed for transmission of the optical signal through a 1-meter hollow-core optical fiber and a 1-meter solid-core optical fiber respectively are 3.3 ns and 4.8 ns. It is clear that when the optical signal passes through the optical fibers with a same distance, a latency needed by the hollow-core optical fiber is far less than that needed by the solid-core optical fiber, and is generally only 69% of that needed by the solid-core optical fiber.

Second, in the system architecture shown in FIG. 6, that is, in the HPC cluster scenario, a transmission distance of the optical fiber is short, and ranges from 5 m to 2,000 m. A typical value is about 10 m to 100 m. Based on the foregoing explanations and descriptions of the hollow-core optical fiber, it can be learned that disadvantages such as a large insertion loss of the existing hollow-core optical fiber and a short length of a single-segment hollow-core optical fiber have little impact on overall performance and costs of the scenario. Therefore, the hollow-core optical fiber may be preferably used in this embodiment of this application, to further reduce the transmission latency.

It should be noted that the system architecture shown in FIG. 6 is merely an example, and is a preferred system architecture or application scenario in this embodiment of this application. The optical/electrical module or the like provided in this embodiment of this application may be used in a scenario other than the HPC cluster shown in FIG. 6. This is not specifically limited in this embodiment of this application. In addition, in some possible implementations, the foregoing node may alternatively be a mobile terminal, for example, a mobile phone, a notebook computer, or a desktop computer. This is not specifically limited in this embodiment of this application.

Figure 7:
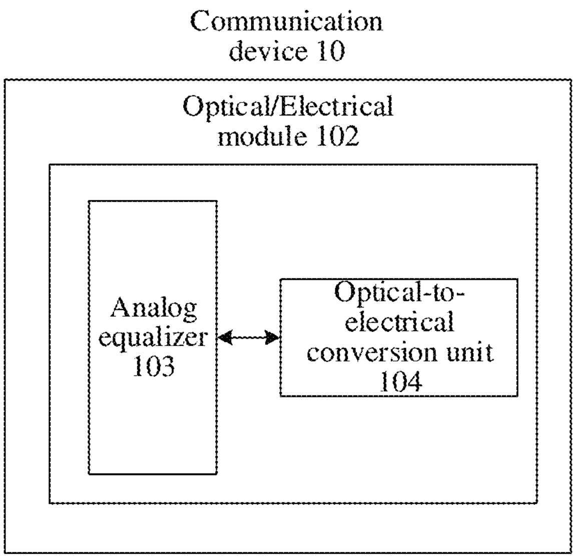
FIG. 7 is a schematic diagram of a structure of an optical/electrical module according to an embodiment of this application.

FIG. 7 is a schematic diagram of a structure of an optical/electrical module according to an embodiment of this application. As shown in FIG. 7, the optical/electrical module 102 may be used in a communication device 10. The communication device 10 may be an optical/electrical communication device, for example, any one of nodes such as the switch (for example, the switch bow, 100*b*, 100*c*, 200*a*, 200*b*, 200*c*, or 300*a*), the server, the random access memory resource pool, and the storage resource pool in the system architecture shown in FIG. 6.

As shown in FIG. 7, the optical/electrical module 102 may include an analog equalizer 103 and an optical/electrical conversion unit 104 connected to the analog equalizer 103. The following describes in detail the optical/electrical module 102 shown in FIG. 7 by separately using an example in which the communication device 10 sends a signal and an example in which the communication device 10 receives a signal.

(1) An example in which the communication device 10 sends a signal to another device is used.

The analog equalizer 103 is configured to: receive a first electrical signal, perform first analog signal equalization processing on the first electrical signal to obtain a second electrical signal, and send the second electrical signal to the optical/electrical conversion unit 104. Optionally, the first electrical signal and the second electrical signal may be analog electrical signals, and inter-symbol interference of the second electrical signal obtained through equalization processing may be less than inter-symbol interference of the first electrical signal.

The optical/electrical conversion unit 104 is configured to: receive the second electrical signal, and convert the second electrical signal into a corresponding first optical signal. Optionally, the first optical signal may be subsequently transmitted to the another device through an optical fiber (for example, a hollow-core optical fiber) connected between the communication device 10 and the another device.

As described above, it should be understood that, in a transmission process before the first electrical signal is input to the analog equalizer 103, a transmission loss (in other words, aberration, where for example, an amplitude, a frequency, and a phase of a signal change, and generally, the loss may mean a decrease in the signal amplitude) is inevitably generated. Therefore, compared with an original first electrical signal (in other words, a first electrical signal at the beginning of transmission), the first electrical signal received by the analog equalizer 103 has signal attenuation and distortion to some extent (where for example, at least one of an amplitude, a frequency, and a phase of the first electrical signal may change, and a typical case is an amplitude decrease and the like), causing severe inter-symbol interference of the first electrical signal received by the analog equalizer 103. It should be noted that the severe inter-symbol interference causes a significant increase in a bit error rate. If no processing is performed, a signal finally received by the another device may be completely incorrect or completely invalid. This severely affects an overall computing capability of the another device and a communication system.

In this way, in this embodiment of this application, efficient and quick analog signal equalization processing may be directly performed on the received first electrical signal in an analog domain by using the analog equalizer 103 added in the optical/electrical module 102, to compensate for the transmission loss generated in the previous transmission process of the first electrical signal, so that the second electrical signal with better signal quality and less signal inter-symbol interference can be output without digital logic processing, serial-to-parallel conversion, and the like. Optionally, the second electrical signal may be as close as possible to the original first electrical signal, even the same as the original first electrical signal, may have less inter-symbol interference than the original first electrical signal, or the like. This is not specifically limited in this embodiment of this application.

In conclusion, when the signal is sent to the another device, the optical/electrical module provided in this embodiment of this application can greatly shorten time consumed for performing signal transmission loss compensation before sending, thereby greatly reducing a transmission latency of transmitting the signal from the communication device 10 to the another device while ensuring signal quality, and reducing computing waiting time of the another device.

(2) An example in which the communication device 10 receives a signal sent by the another device is used.

The optical/electrical conversion unit 104 is configured to: receive a second optical signal, convert the second optical signal into a corresponding third electrical signal, and send the third electrical signal to the analog equalizer 103. Optionally, the second optical signal may be a signal sent by the another device to the optical/electrical conversion unit 104 through the optical fiber.

The analog equalizer 103 is configured to: receive the third electrical signal, and perform second analog signal equalization processing on the third electrical signal to obtain a fourth electrical signal. Optionally, the third electrical signal and the fourth electrical signal may be analog electrical signals, and inter-symbol interference of the fourth electrical signal obtained through equalization processing may be less than inter-symbol interference of the third electrical signal. Optionally, the communication device 10 may subsequently perform a series of computing, analysis, or the like based on the fourth electrical signal.

Optionally, the first electrical signal, the second electrical signal, the third electrical signal, and the fourth electrical signal may be high-speed electrical signals whose baud rate is greater than a baud rate of 25 G, even greater than a baud rate of 50 G, or the like. This is not specifically limited in this embodiment of this application.

As described above, correspondingly, in a transmission process before the third electrical signal is input to the analog equalizer, a transmission loss (in other words, aberration) is inevitably generated. Therefore, the third electrical signal received by the analog equalizer 103 usually has signal attenuation and distortion to some extent, causing severe inter-symbol interference of the third electrical signal received by the analog equalizer 103. Consequently, a signal finally received by the communication device 10 may be completely incorrect or completely invalid. This severely affects an overall computing capability of the communication device 10 and the communication system.

In this way, in this embodiment of this application, efficient and quick analog signal equalization processing may be directly performed on the received third electrical signal in the analog domain by using the analog equalizer 103 added in the optical/electrical module 102, to output the fourth electrical signal with better signal quality and less signal inter-symbol interference. Optionally, the fourth electrical signal may be as close as possible to the third electrical signal originally output by the optical/electrical conversion unit 104, as close as possible to an electrical signal originally output by the another device, even the same as the electrical signal originally output by the another device, may have less inter-symbol interference than the electrical signal originally output by the another device, or the like. This is not specifically limited in this embodiment of this application.

In conclusion, when the signal sent by the another device is received, the optical/electrical module provided in this embodiment of this application can greatly shorten time consumed by the local device (that is, the communication device 10) to perform signal transmission loss compensation before computing, thereby greatly reducing a transmission latency of transmitting the signal from the another device to the communication device 10 while ensuring signal quality, reducing computing waiting time of the communication device 10, and improving the overall computing capability.

Optionally, the communication device 10 may be configured only to send a signal or only to receive a signal. To be specific, the analog equalizer 103 and the optical/electrical conversion unit 104 in the optical/electrical module 102 are configured only to implement the function described in (1) in the foregoing embodiment, or the analog equalizer 103 and the optical/electrical conversion unit 104 are configured only to implement the function described in (2) in the foregoing embodiment. This is not specifically limited in this embodiment of this application.

Figure 8:
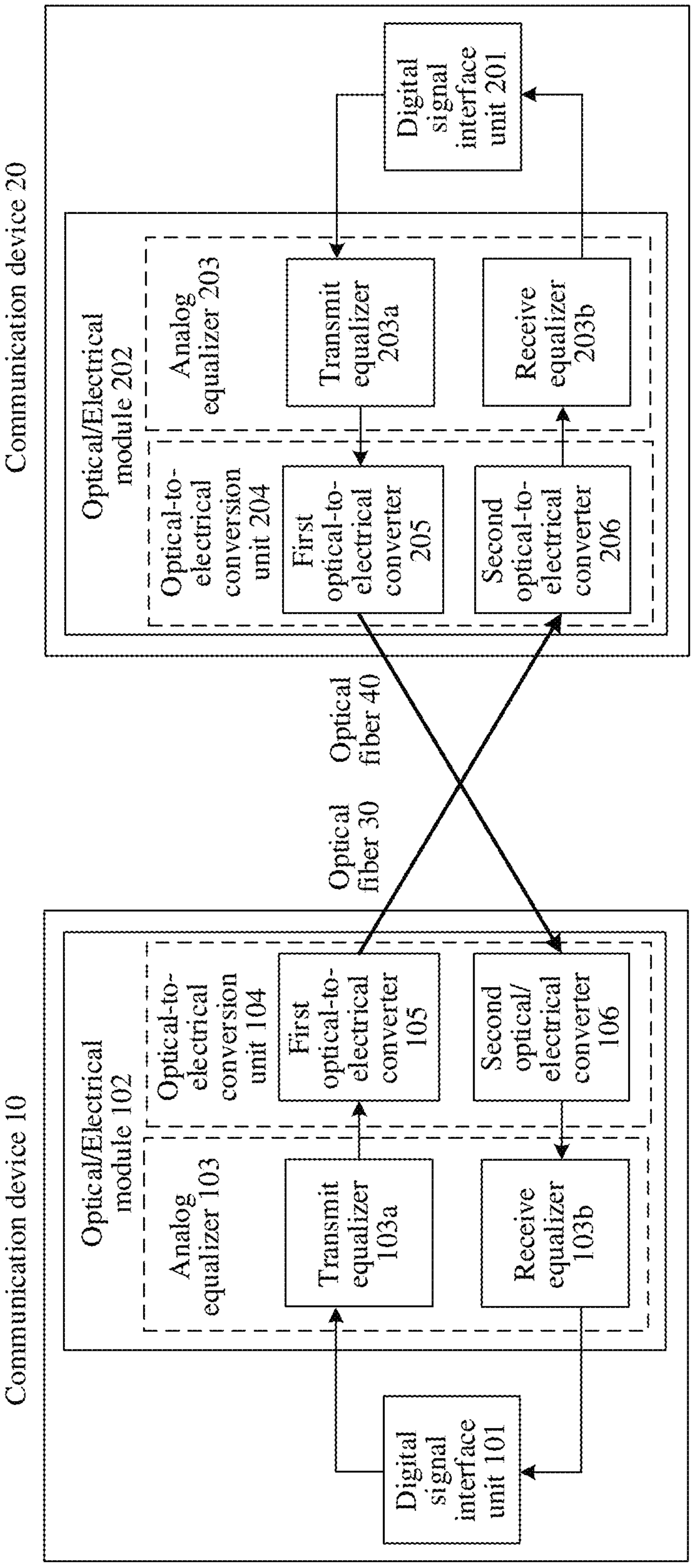
FIG. 8 is a schematic diagram of a structure of a communication system according to an embodiment of this application.

FIG. 8 is a schematic diagram of a structure of a communication system according to an embodiment of this application. As shown in FIG. 8, the communication system may include a communication device 10 (for example, a first communication device) and a communication device 20 (for example, a second communication device). The communication device 10 and the communication device 20 may be connected through an optical fiber 30 and an optical fiber 40 shown in FIG. 8. The communication device 10 and the communication device 20 may be any one of the nodes such as the switch, the server, the random access memory resource pool, and the storage resource pool in the system architecture shown in FIG. 6.

As shown in FIG. 8, the communication device 10 may include a digital signal interface unit 101 and an optical/electrical module 102. The optical/electrical module 102 may include an analog equalizer 103 and an optical/electrical conversion unit 104. The analog equalizer 103 may include a transmit equalizer 103*a* and a receive equalizer 103*b*. The optical/electrical conversion unit 104 may include a first optical/electrical converter 105 and a second optical/electrical converter 106. The transmit equalizer 103*a* may be separately connected to the digital signal interface unit 101 and the first optical/electrical converter 105. The receive equalizer 103*b* may be separately connected to the digital signal interface unit 101 and the second optical/electrical converter 106.

Optionally, refer to the embodiment corresponding to FIG. 7. It can be learned that the analog equalizer 103 in this embodiment of this application may include only the transmit equalizer 103*a*, and correspondingly, the optical/electrical conversion unit 104 in this embodiment of this application may include only the first optical/electrical converter 105. Alternatively, the analog equalizer 103 may include only the receive equalizer 103*b*, and correspondingly, the optical/electrical conversion unit 104 may include only the second optical/electrical converter 106. This is not specifically limited in this embodiment of this application.

As shown in FIG. 8, similarly, the communication device 20 may include a digital signal interface unit 201 and an optical/electrical module 202. The optical/electrical module 202 may include an analog equalizer 203 and an optical/electrical conversion unit 204. The analog equalizer 203 may include a transmit equalizer 203*a* and a receive equalizer 203*b*. The optical/electrical conversion unit 204 may include a first optical/electrical converter 205 and a second optical/electrical converter 206. The transmit equalizer 203*a* may be separately connected to the digital signal interface unit 201 and the first optical/electrical converter 205. The receive equalizer 203*b* may be separately connected to the digital signal interface unit 201 and the second optical/electrical converter 206.

Optionally, the digital signal interface unit 101 and the digital signal interface unit 201 may be any one of a network processing interface unit, a data exchange unit, a storage interface unit, a random access memory interface unit, or the like. This is not specifically limited in this embodiment of this application.

Further, as shown in FIG. 8, the first optical/electrical converter 105 and the second optical/electrical converter 206 are connected through the optical fiber 30, to provide a transmission channel for the communication device 10 to send a signal to the communication device 20. The second optical/electrical converter 106 and the first optical/electrical converter 205 are connected through the optical fiber 40, to provide a transmission channel for the communication device 20 to send a signal to the communication device 10. The optical fiber 30 and the optical fiber 40 may be solid-core optical fibers or hollow-core optical fibers, and the hollow-core optical fibers are preferred, to provide a low-latency transmission channel for optical signal transmission. For details, refer to the descriptions in the embodiment corresponding to FIG. 6, and details are not described herein again. For example, when the optical fiber 30 is the hollow-core optical fiber, it may also indicate that the optical fiber 30 includes at least one segment of hollow-core optical fiber. For example, a total length of the optical fiber 30 is 100 m, and the optical fiber 30 may include a segment of hollow-core optical fiber whose length is 40 m. This is not specifically limited in this embodiment of this application.

With reference to the communication device 10 and the communication device 20 shown in FIG. 8, the following further describes in detail an optical/electrical module provided in this embodiment of this application by using an example in which the communication device 10 sends a signal to the communication device 20.

First, it should be noted that when a signal is transmitted between two communication devices, unflatness characteristics of a transmission parameter of a device and a channel transmission parameter cause signal aberration, resulting in unflatness of a signal amplitude-frequency characteristic, a fluctuation of a group latency characteristic, and the like. Consequently, inter-symbol interference of the signal is extremely severe. That the communication device 10 sends the signal to the communication device 20 is used as an example. Possible signal aberration may roughly include but is not limited to the following:

(1) aberration that may occur during transmission between the digital signal interface unit 101 and the transmit equalizer 103*a;*

(2) aberration that may occur during transmission between the transmit equalizer 103*a* and the first optical/electrical converter 105;

(3) aberration that may occur when the first optical/electrical converter 105 converts an electrical signal into an optical signal;

(4) aberration that may occur at a connection between the first optical/electrical converter 105 and the optical fiber 30;

(5) aberration that may occur during transmission of the optical signal in the optical fiber 30;

(6) aberration that may occur at a connection between the optical fiber 30 and the second optical/electrical converter 206;

(7) aberration that may occur when the second optical/electrical converter 206 converts the optical signal into an electrical signal;

(8) aberration that may occur during transmission between the second optical/electrical converter 206 and the receive equalizer 203*b*; and (9) aberration that may occur during transmission between the receive equalizer 203*b* and the digital signal interface unit 201.

Second, functions of each structure in the process are described in detail by using an example in which the communication device 10 sends the signal to the communication device 20. Details are as follows.

The digital signal interface unit 101 receives a first digital electrical signal from a processing device (not shown in FIG. 8), converts the first digital electrical signal into a corresponding analog electrical signal (for example, a first electrical signal), and sends the first electrical signal to the transmit equalizer 103*a*. Optionally, the processing device may be connected to the digital signal interface unit 101, and for example, may be a CPU, a GPU, or a memory.

The transmit equalizer 103*a* receives the first electrical signal, and performs analog signal equalization processing on the first electrical signal in an analog domain, to compensate for aberration (for example, including the foregoing aberration (1)) of the first electrical signal in a previous transmission process, and reduce inter-symbol interference of the first electrical signal, so that a second electrical signal is obtained, and then the second electrical signal is sent to the first optical/electrical converter 105.

Optionally, considering that a large quantity of aberration (for example, at least one of the foregoing distortion (2), (3), (4), (5), (6), (7), and (8)) may exist in a subsequent transmission process of the electrical signal, and that a high-frequency part of the electrical signal is likely to have severe attenuation, therefore, to ensure that an electrical signal received by the receive equalizer 203*b* in the communication device 20 has no severe inter-symbol interference, the transmit equalizer 103*a* may further perform pre-equalization processing on the first electrical signal. For example, a low-frequency part of the first electrical signal may be properly attenuated, so that compared with a case in which the pre-equalization processing is not performed, an amplitude difference between a high-frequency part and a low-frequency part of the electrical signal subsequently received by the receive equalizer 203*b* in the communication device 20 may be reduced. This reduces inter-symbol interference of the electrical signal received by the receive equalizer 203*b*, and the like. This is not specifically limited in this embodiment of this application.

The first optical/electrical converter 105 receives the second electrical signal, converts the second electrical signal into a corresponding first optical signal, and inputs the first optical signal to the optical fiber 30.

The optical fiber 30 receives the first optical signal, and then sends the first optical signal to the second optical/electrical converter 206 in the communication device 20.

The second optical/electrical converter 206 receives the first optical signal, converts the first optical signal into a corresponding electrical signal (for example, a third electrical signal), and sends the third electrical signal to the receive equalizer 203*b*. It may be understood that, because structures of the communication device 10 and the communication device 20 are similar, and sending and receiving are symmetrical, the first optical signal received by the communication device 20 is equivalent to the second optical signal received by the communication device 10 in the embodiment in FIG. 7. Each of the first optical signal and the second optical signal is an optical signal that is received by a local device and that is sent by another device. Therefore, the third electrical signal herein may be used only to represent an electrical signal obtained by converting the optical signal received by the local device, and does not specifically indicate an electrical signal obtained by converting the second optical signal.

The receive equalizer 203*b* receives the third electrical signal, and performs analog signal equalization processing on the third electrical signal in the analog domain, to compensate for aberration (for example, including the foregoing aberration (2), (3), (4), (5), (6), (7), and (8)) of the third electrical signal in a previous transmission process, and reduce inter-symbol interference of the third electrical signal, so that a fourth electrical signal is obtained, and then the fourth electrical signal is sent to the digital signal interface unit 201. Optionally, correspondingly, in consideration of possible aberration in a process in which the signal is subsequently transmitted to the digital signal interface unit 201, therefore, to ensure that inter-symbol interference of an electrical signal received by the digital signal interface unit 201 is still low or even zero, the receive equalizer 203*b* may further perform pre-equalization processing or the like on the third electrical signal. This is not specifically limited in this embodiment of this application.

The digital signal interface unit 201 receives the fourth electrical signal, converts the fourth electrical signal into a corresponding digital electrical signal (for example, a second digital electrical signal), and sends the second digital electrical signal to a processing device in the communication device 20, so that the processing device in the communication device 20 can perform a series of computing, analysis, or the like based on the second digital electrical signal.

So far, an entire process in which the communication device 10 sends the signal to the communication device 20 is completed. It may be understood that this application aims to directly perform equalization processing on the signal in the analog domain by disposing the analog equalizer in the optical/electrical module, to compensate for aberration generated in the signal transmission process, thereby achieving short time consumption and effectively ensuring quality of the fourth electrical signal or even the second digital electrical signal finally received by the communication device 20. Optionally, through equalization processing performed by the analog equalizer, the fourth electrical signal or the second digital electrical signal finally received by the communication device 20 may be as close as possible to the first electrical signal or the first digital electrical signal initially output by the communication device 10, or even the same as the first electrical signal or the first digital electrical signal, thereby ensuring effective and reliable signal transmission.

It may be understood that, because the structures of the communication device 20 and the communication device 10 are similar, similarly, for a process in which the communication device 20 sends a signal to the communication device 10, refer to the foregoing process in which the communication device 10 sends the signal to the communication device 20. Details are not described herein again.

Refer to Table 1 shown below. It can be learned, with reference to the embodiments described in FIG. 4, FIG. 7, and FIG. 8, that in this embodiment of this application, when the analog equalizer and the hollow-core optical fiber are used, a signal transmission latency is significantly reduced. As shown in Table 1, in this application, the total transmission latency between the communication device 10 and the communication device 20 in the embodiment shown in FIG. 8 is only 175 ns, and the transmission latency between the node A and the node B in the embodiment shown in FIG. 4 is up to 350 ns. The signal transmission latency in this embodiment of this application is only 50% of that in a conventional technology. Specific differences are as follows.

(1) In this embodiment of this application, the analog equalizer is used to replace an original CDR. Compared with the original CDR, the analog equalizer has no large latency caused by digital logic processing, serial-to-parallel conversion, and the like, and only a routing latency of an electrical signal in the analog equalizer exists. As an integrated circuit chip, the analog equalizer has a very short internal routing length, and the caused latency is negligible and almost zero, thereby reducing a latency by about 100 ns.

(2) In this embodiment of this application, the hollow-core optical fiber is used to replace an original solid-core optical fiber (an SMF, an MMF, or the like) and is used as a transmission channel between communication devices (in other words, nodes). For example, transmission through an optical fiber whose length is 50 m is used as an example. In this embodiment of this application, a latency is reduced by about 75 ns.

For a specific latency and a ratio, refer to content in the following Table 1. Details are not described herein again.

TABLE 1

| Comparison items | Latency in the conventional technology | Latency in this application | Latency in this application/Latency in the conventional technology |
|---|---|---|---|
| CDR | 100 ns | | 0% |
| Analog equalizer | | 0 ns | |
| Optical fiber latency | 240 ns | 165 ns | 69% |
| Routing latency of an electrical signal | 10 ns | 10 ns | 100% |
| Total latency | 350 ns | 175 ns | 50% |

Figure 9:
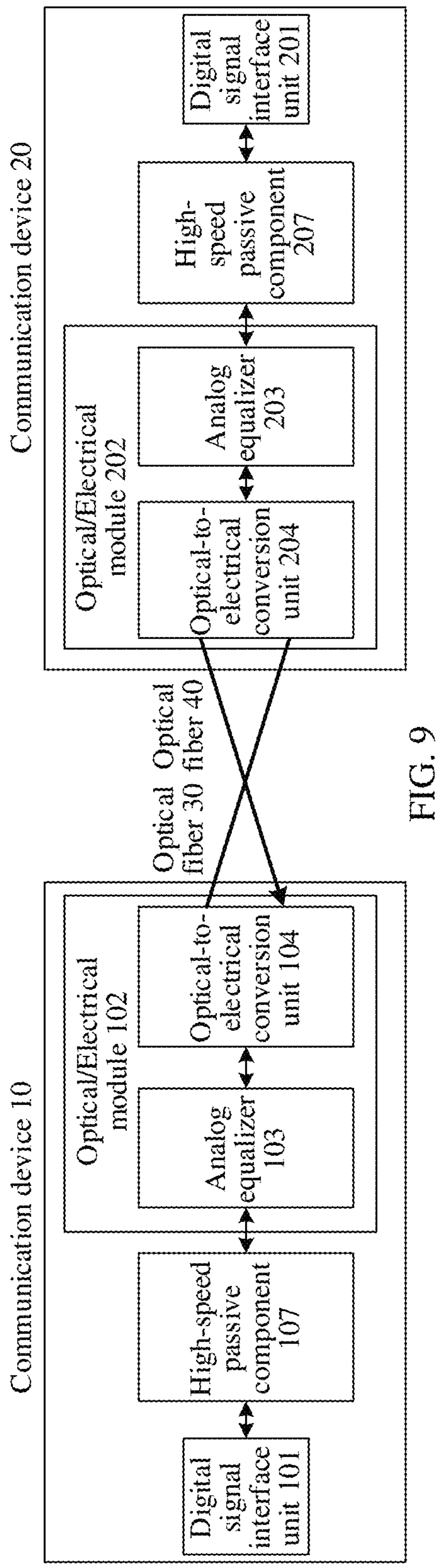
FIG. 9 is a schematic diagram of a structure of another communication system according to an embodiment of this application.

Optionally, FIG. 9 is a schematic diagram of a structure of another communication system according to an embodiment of this application. For descriptions of FIG. 9, refer to the descriptions in the embodiments corresponding to FIG. 7 and FIG. 8. Details are not described herein again. As shown in FIG. 9, further, a communication device 10 and a communication device 20 may respectively include a high-speed passive component 107 and a high-speed passive component 207. The high-speed passive component 107 is configured to connect a digital signal interface unit 101 to an analog equalizer 103 (for example, including a transmit equalizer 103*a* and a receive equalizer 103*b*). Correspondingly, the high-speed passive component 207 is configured to connect a digital signal interface unit 201 to an analog equalizer 203 (for example, including a transmit equalizer 203*a* and a receive equalizer 203*b*).

The communication device 10 is used as an example. Two ends of the high-speed passive component 107 are respectively connected to the digital signal interface unit 101 and the analog equalizer 103 in an optical/electrical module 102, so that a high-speed electrical signal transmission channel with a low latency, a low insertion loss, and low aberration may be provided between the digital signal interface unit 101 and the analog equalizer 103, and a transmission latency of the channel is almost zero. In this way, even if the analog equalizer 103 is deployed at a position far away from the digital signal interface unit, a transmission latency, a transmission loss, and aberration of a high-speed electrical signal (for example, a first electrical signal or a fourth electrical signal) in a transmission process between the digital signal interface unit 101 and the analog equalizer 103 can be reduced. Therefore, compared with the communication system shown in FIG. 8, the communication system shown in FIG. 9 may further reduce a signal transmission latency by using the high-speed passive component in the communication device, and ensure signal transmission quality, thereby further improving an overall computing capability of the communication system.

Figure 10:
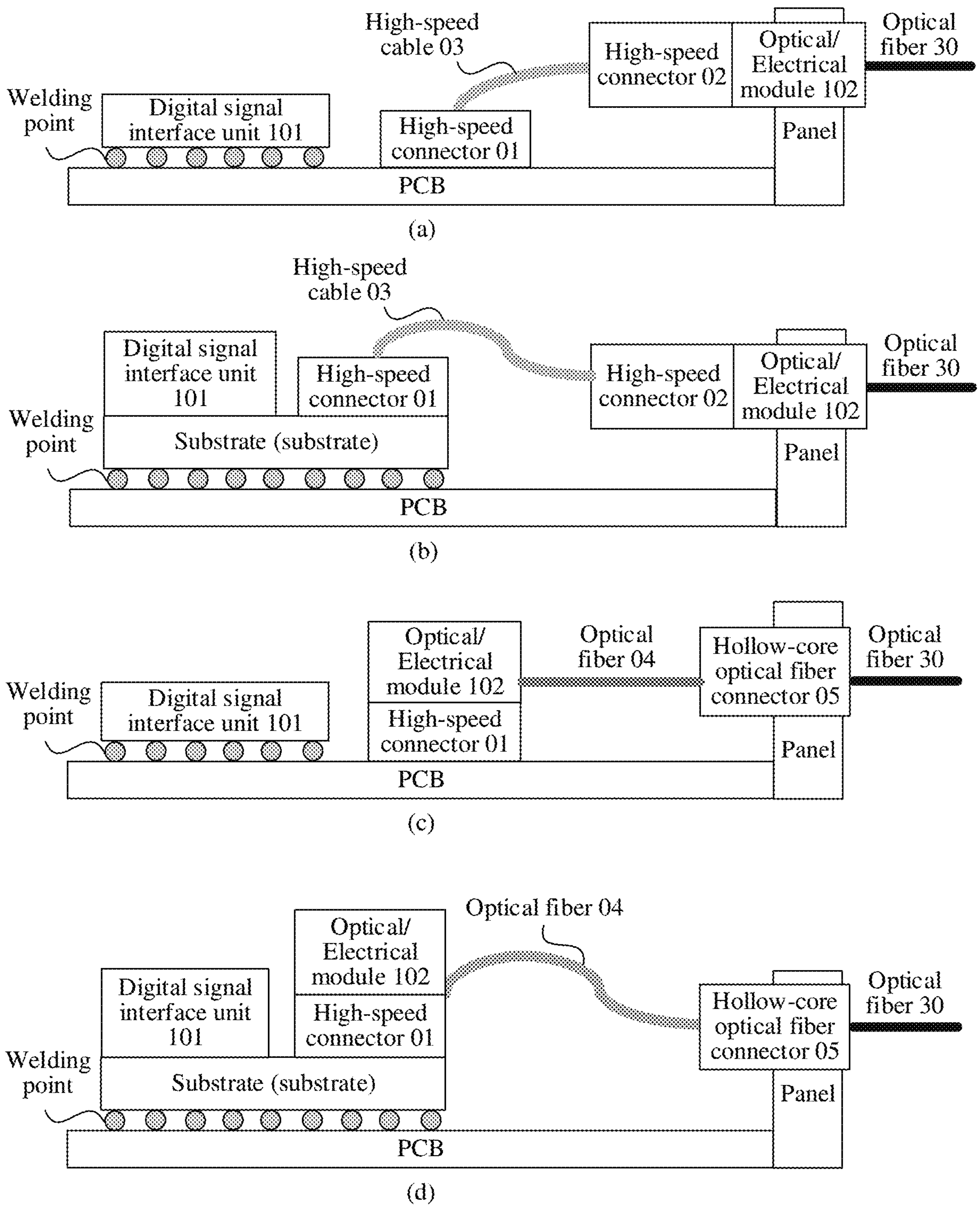
FIG. 10 is a schematic diagram of internal connection structures of a group of communication devices according to an embodiment of this application.

FIG. 10 is a schematic diagram of internal connection structures of a group of communication devices according to an embodiment of this application. In FIG. 10, the communication device 10 shown in FIG. 9 is used as an example. It may be understood that the connection structure shown in FIG. 10 may alternatively be used in a communication device 20 or any other communication device, and details are not described herein again.

As shown in (a) in FIG. 10, the communication device 10 may specifically include a digital signal interface unit 101, a high-speed connector 01, a high-speed connector 02, a high-speed cable 03, and an optical/electrical module 102.

Optionally, the digital signal interface unit 101 may be included in a packaged integrated circuit chip. As shown in (a) in FIG. 10, the integrated circuit chip may be deployed on a PCB. As shown in (a) in FIG. 10, the digital signal interface unit 101 (in other words, the integrated circuit chip) may be welded on the PCB by using several welding points.

Optionally, the high-speed connector 01 may be deployed at a position that is on the PCB and that is close to the digital signal interface unit 101 (in other words, close to the integrated circuit chip). The high-speed connector 01 is connected to the high-speed connector 02 through the high-speed cable 03, so that the high-speed passive component 107 shown in FIG. 9 may be formed. Correspondingly, a high-speed passive component 207 in the communication device 20 may also include the high-speed connector 01, the high-speed connector 02, and the high-speed cable 03. Optionally, there may be a long distance between the high-speed connector 01 and the high-speed connector 02.

Optionally, the high-speed connector 02 and the optical/electrical module 102 may be connected on a panel shown in FIG. 10.

Optionally, the optical/electrical module 102 is connected to an optical fiber 30, and is configured to: input/output an optical signal, perform corresponding optical/electrical conversion, and the like. Details are not described herein again.

In conclusion, that the communication device 10 sends a signal to the communication device 20 is used as an example. As shown in (a) in FIG. 10, a high-speed electrical signal (for example, a first electrical signal) output by the digital signal interface unit 101 sequentially passes through the PCB, the high-speed connector 01, the high-speed cable 03, the high-speed connector 02, and the optical/electrical module 102. After analog signal equalization processing and electrical-to-optical conversion are performed in the optical/electrical module 102, a corresponding optical signal is output to the optical fiber 30. Subsequently, through transmission of the optical fiber 30, the optical fiber 30 outputs the optical signal to an optical/electrical module 202 of the communication device 20. After optical-to-electrical conversion and analog signal equalization processing are performed in the optical/electrical module 202, a corresponding high-speed electrical signal is output, sequentially passes through the high-speed connector 02, the high-speed cable 03, the high-speed connector 01, and the PCB in the communication device 20, and finally is input to a digital signal interface unit 201.

As shown in (b) in FIG. 10, the communication device 10 may specifically include a digital signal interface unit 101, a high-speed connector 01, a high-speed connector 02, a high-speed cable 03, and an optical/electrical module 102.

Optionally, the digital signal interface unit 101 may be included in an integrated circuit chip (where the integrated circuit chip may be unpackaged). As shown in (b) in FIG. 10, the integrated circuit chip may be deployed on a substrate, and the substrate may be deployed on a PCB. As shown in (b) in FIG. 10, the substrate may be welded on the PCB by using several welding points.

Optionally, the high-speed connector 01 may be deployed at a position that is on the substrate and that is close to the digital signal interface unit 101 (in other words, close to the integrated circuit chip).

Optionally, for descriptions of (b) in FIG. 10, refer to the descriptions of (a) in FIG. 10. Details are not described herein again.

In conclusion, that the communication device 10 sends a signal to the communication device 20 is still used as an example. As shown in (b) in FIG. 10, a high-speed electrical signal output by the digital signal interface unit 101 sequentially passes through the substrate, the high-speed connector 01, the high-speed cable 03, the high-speed connector 02, and the optical/electrical module 102. After analog signal equalization processing and electrical-to-optical conversion are performed in the optical/electrical module 102, a corresponding optical signal is output to the optical fiber 30. Subsequently, through transmission of the optical fiber 30, the optical fiber 30 outputs the optical signal to an optical/electrical module 202 of the communication device 20. After optical-to-electrical conversion and analog signal equalization processing are performed in the optical/electrical module 202, a corresponding high-speed electrical signal is output, sequentially passes through the high-speed connector 02, the high-speed cable 03, the high-speed connector 01, and the substrate in the communication device 20, and finally is input to a digital signal interface unit 201.

As shown in (c) in FIG. 10, the communication device 10 may specifically include a digital signal interface unit 101, a high-speed connector 01, an optical/electrical module 102, an optical fiber 04, and a hollow-core optical fiber connector 05.

Optionally, the digital signal interface unit 101 may be included in a packaged integrated circuit chip. As shown in (c) in FIG. 10, the integrated circuit chip may be deployed on a PCB. As shown in (c) in FIG. 10, the digital signal interface unit 101 (in other words, the integrated circuit chip) may be welded on the PCB by using several welding points.

Optionally, the high-speed connector 01 may be deployed at a position that is on the PCB and that is close to the digital signal interface unit 101 (in other words, close to the integrated circuit chip), and is configured to connect the digital signal interface unit 101 to the optical/electrical module 102, and is specifically configured to connect the digital signal interface unit 101 to an analog equalizer 103 in the optical/electrical module 102. Optionally, the high-speed passive component 107 or the high-speed passive component 207 shown in FIG. 9 may include only the high-speed connector 01.

Optionally, as shown in (c) in FIG. 10, the optical/electrical module 102 may include a segment of optical fiber 04. The optical fiber 04 may be connected to an optical/ electrical conversion unit 104 (that is, a first optical/electrical converter 105 and a second optical/electrical converter 106) in the optical/electrical module 102, and may be configured to input/output an optical signal, for example, may be configured to send the foregoing first optical signal, or may be configured to receive the foregoing second optical signal. Optionally, the optical fiber 04 may be a hollow-core optical fiber or an optical fiber that is from a solid-core optical fiber to a hollow-core optical fiber, and correspondingly, an optical fiber 30 may be a hollow-core optical fiber (in other words, including at least one segment of hollow-core optical fiber).

Optionally, as shown in (c) in FIG. 10, the optical fiber 04 may be connected to the optical fiber 30 on a panel of the communication device 10 by using the hollow-core optical fiber connector 05. The hollow-core optical fiber connector 05 may be configured to input/output an optical signal between the optical fiber 04 and the optical fiber 30, for example, may be configured to: receive the foregoing first optical signal from the optical fiber 04, and send the first optical signal to the optical fiber 30, or receive the foregoing second optical signal from the optical fiber 30, and send the second optical signal to the optical fiber 04. In this way, based on the optical fiber 04 and the hollow-core optical fiber connector 05 that are added in the communication device 10, a low-loss and high-rate transmission channel may be provided for optical signal transmission inside and outside the device, thereby further reducing a transmission loss, ensuring signal quality, and reducing a transmission latency.

In conclusion, that the communication device 10 sends a signal to the communication device 20 is still used as an example. As shown in (c) in FIG. 10, a high-speed electrical signal output by the digital signal interface unit 101 sequentially passes through the PCB, the high-speed connector 01, and the optical/electrical module 102. After analog signal equalization processing and electrical-to-optical conversion are performed in the optical/electrical module 102, an optical signal that is output sequentially passes through the optical fiber 04, the hollow-core optical fiber connector 05, and the optical fiber 30. Subsequently, through transmission of the optical fiber 30, the optical fiber 30 outputs the optical signal to an optical/electrical module 202 in the communication device 20. Optionally, the communication device 20 may also include a hollow-core optical fiber connector and a segment of hollow-core optical fiber or an optical fiber that is from a solid-core optical fiber to a hollow-core optical fiber. In this way, the optical signal output by the optical fiber 30 may be input to the optical/electrical module 202 sequentially through the hollow-core optical fiber connector and the segment of hollow-core optical fiber or the optical fiber that is from the solid-core optical fiber to the hollow-core optical fiber. Subsequently, after optical-to-electrical conversion and analog signal equalization processing are performed in the optical/electrical module 202, a corresponding high-speed electrical signal is output, sequentially passes through the high-speed connector 01 and the PCB in the communication device 20, and finally is input to a digital signal interface unit 201.

As shown in (d) in FIG. 10, the communication device 10 may specifically include a digital signal interface unit 101, a high-speed connector 01, an optical/electrical module 102, an optical fiber 04, and a hollow-core optical fiber connector 05.

Optionally, the digital signal interface unit 101 may be included in an integrated circuit chip (where the integrated circuit chip may be unpackaged). As shown in (d) in FIG. 10, the integrated circuit chip may be deployed on a substrate, and the substrate may be deployed on a PCB. As shown in (d) in FIG. 10, the substrate may be welded on the PCB by using several welding points.

Optionally, the high-speed connector 01 may be deployed at a position that is on the substrate and that is close to the digital signal interface unit 101 (in other words, close to the integrated circuit chip).

Optionally, for descriptions of (d) in FIG. 10, refer to the descriptions of (c) in FIG. 10. Details are not described herein again.

In conclusion, that the communication device 10 sends a signal to the communication device 20 is still used as an example. As shown in (d) in FIG. 10, a high-speed electrical signal output by the digital signal interface unit 101 sequentially passes through the substrate, the high-speed connector 01, and the optical/electrical module 102. After analog signal equalization processing and electrical-to-optical conversion are performed in the optical/electrical module 102, an optical signal that is output sequentially passes through the optical fiber 04, the hollow-core optical fiber connector 05, and the optical fiber 30. Subsequently, through transmission of the optical fiber 30, the optical fiber 30 outputs the optical signal to an optical/electrical module 202 in the communication device 20. Optionally, the communication device 20 may also include a hollow-core optical fiber connector and a segment of hollow-core optical fiber or an optical fiber that is from a solid-core optical fiber to a hollow-core optical fiber. In this way, the optical signal output by the optical fiber 30 may be input to the optical/electrical module 202 sequentially through the hollow-core optical fiber connector and the segment of hollow-core optical fiber or the segment of optical fiber that is from the solid-core optical fiber to the hollow-core optical fiber. Subsequently, after optical-to-electrical conversion and analog signal equalization processing are performed in the optical/electrical module 202, a corresponding high-speed electrical signal is output, sequentially passes through the high-speed connector 01 and the substrate in the communication device 20, and finally is input to a digital signal interface unit 201.

Refer to Table 2 shown below. It can be learned, with reference to the embodiments corresponding to FIG. 5, FIG. 9, and FIG. 10, that in this embodiment of this application, when the high-speed passive component, the analog equalizer, and the hollow-core optical fiber are used, a signal transmission latency is significantly reduced. As shown in the following Table 2, in this application, the total transmission latency between the communication device 10 and the communication device 20 in the embodiment shown in FIG. 9 is only 175 ns, and the transmission latency between the node C and the node D in the embodiment shown in FIG. 5 is up to 450 ns. The signal transmission latency in this embodiment of this application is only 39% of that in a conventional technology. Specific differences are as follows.

(1) In this embodiment of this application, a high-speed passive component combination is used to replace an original relay CDR, and is configured to connect the digital signal interface unit to the optical/electrical module, thereby reducing a latency by about 100 ns.

(2) In this embodiment of this application, the analog equalizer is used to replace an original CDR, so that complex digital logic processing, serial-to-parallel conversion, and the like are avoided, thereby reducing a latency by about 100 ns.

(3) In this embodiment of this application, the hollow-core optical fiber is used to replace an original solid-core optical fiber (an SMF, an MMF, or the like) and is used as a transmission channel between communication devices (in other words, nodes). For example, transmission through an optical fiber whose length is 50 m is used as an example. In this embodiment of this application, a latency is reduced by about 75 ns.

For a specific latency and a ratio, refer to content in the following Table 2. Details are not described herein again.

TABLE 2

| Comparison items | Latency in the conventional technology | Latency in this application | Latency in this application/Latency in the conventional technology |
|---|---|---|---|
| Relay CDR | 100 ns | | 0% |
| CDR | 100 ns | | 0% |
| High-speed passive | | 0 ns | |
| Analog equalizer | | 0 ns | |
| Optical fiber latency | 240 ns | 165 ns | 69% |
| Routing latency of an electrical signal | 10 ns | 10 ns | 100% |
| Total latency | 450 ns | 175 ns | 39% |

Further, as described above, to overcome signal aberration caused by unflatness characteristics of a device and a channel (that is, a channel through which a signal passes in a process of transmission between devices), an equalizer needs to be added in a necessary place (for example, between the digital signal interface unit 101 and the optical/electrical conversion unit 104) to eliminate the signal aberration, to compensate for an unflatness change caused by the device and the channel, thereby reducing the signal aberration. The analog equalizer used in this embodiment of this application is mainly configured to correct an amplitude, a frequency characteristic, a phase frequency characteristic, and the like of a transmitted signal. Optionally, analysis and design may be performed on an amplitude equalizer and a phase equalizer, to obtain the analog equalizer in this embodiment of this application. A design indicator of the analog equalizer may mainly relate to equalization bandwidth, an equalization amount, and the like. This is not specifically limited in this embodiment of this application.

Figure 11:
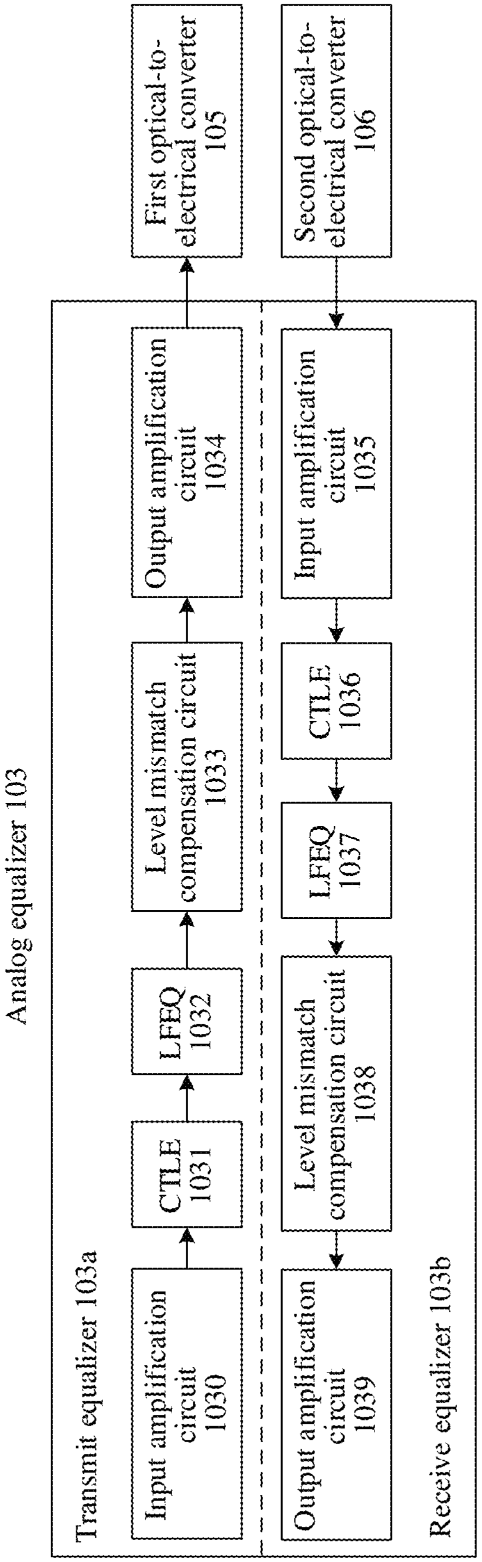
FIG. 11 is a schematic diagram of a structure of an analog equalizer according to an embodiment of this application.

In view of this, FIG. 11 is a schematic diagram of a structure of an analog equalizer according to an embodiment of this application. As shown in FIG. 11, the analog equalizer 103 in the communication device 10 shown in FIG. 7, FIG. 8, or FIG. 9 is used as an example. The analog equalizer 103 may include a transmit equalizer 103*a* and a receive equalizer 103*b*. As shown in FIG. 11, the transmit equalizer 103*a* may include an input amplification circuit 1030, a continuous time linear equalizer (CTLE) 1031, a low frequency equalizer (LFEQ) 1032, a level mismatch compensation circuit 1033, and an output amplification circuit 1034 that are sequentially connected in series. Correspondingly, as shown in FIG. 11, the receive equalizer 103*b* may include an input amplification circuit 1035, a continuous time linear equalizer 1036, a low frequency equalizer 1037, a level mismatch compensation circuit 1038, and an output amplification circuit 1039 that are sequentially connected in series. Optionally, the structure of the analog equalizer shown in FIG. 11 may be further used in an analog equalizer 203 in a communication device 20 or an analog equalizer of any other communication device.

First, a process in which the analog equalizer 103 performs analog signal equalization processing is described in detail by using the transmit equalizer 103*a* as an example.

An input end of the input amplification circuit 1030 may be connected to a digital signal interface unit 101 (or connected to a high-speed passive component 107), and is configured to: receive a high-speed electrical signal (for example, a first electrical signal) output by the digital signal interface unit 101, amplify the first electrical signal to obtain a first electrical signal-A, and send the first electrical signal-A to the continuous time linear equalizer 1031.

Figure 12:
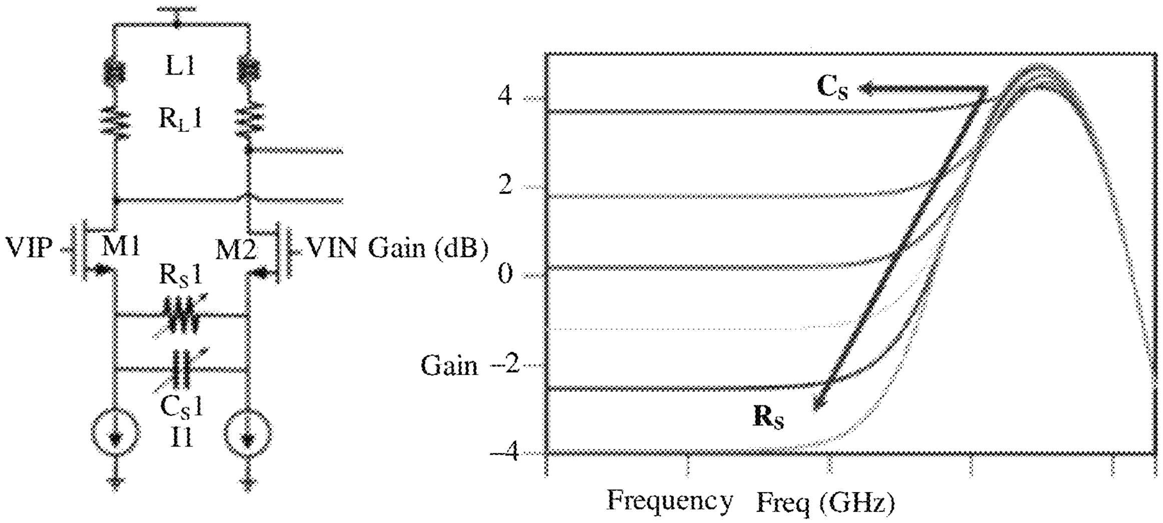
FIG. 12 is a schematic diagram of a circuit structure of a CTLE and gain curve adjustment according to an embodiment of this application.

The continuous time linear equalizer 1031 is configured to: receive the first electrical signal-A, compensate for a signal transmission loss of a high-frequency part (in other words, a high-frequency component) of the first electrical signal-A, to reduce inter-symbol interference of the high-frequency part of the first electrical signal-A to obtain a first electrical signal-B, and then send the first electrical signal-B to the low frequency equalizer 1032. FIG. 12 is a schematic diagram of a circuit structure of a CTLE and gain curve adjustment according to an embodiment of this application. As shown in FIG. 12, a peak value may be adjusted by adjusting Rs1 (a series equivalent resistance) and Cs1 (a series equivalent capacitance) in the CTLE circuit, and frequency compensation is performed in a targeted way, to implement a flat gain curve (that is, an amplitude-frequency characteristic of an electrical signal is adjusted). It should be understood that the circuit structure shown in FIG. 12 is merely an example. In some possible embodiments, the CTLE circuit may include more or fewer components than those shown in FIG. 12. This is not specifically limited in this embodiment of this application.

Figure 13:
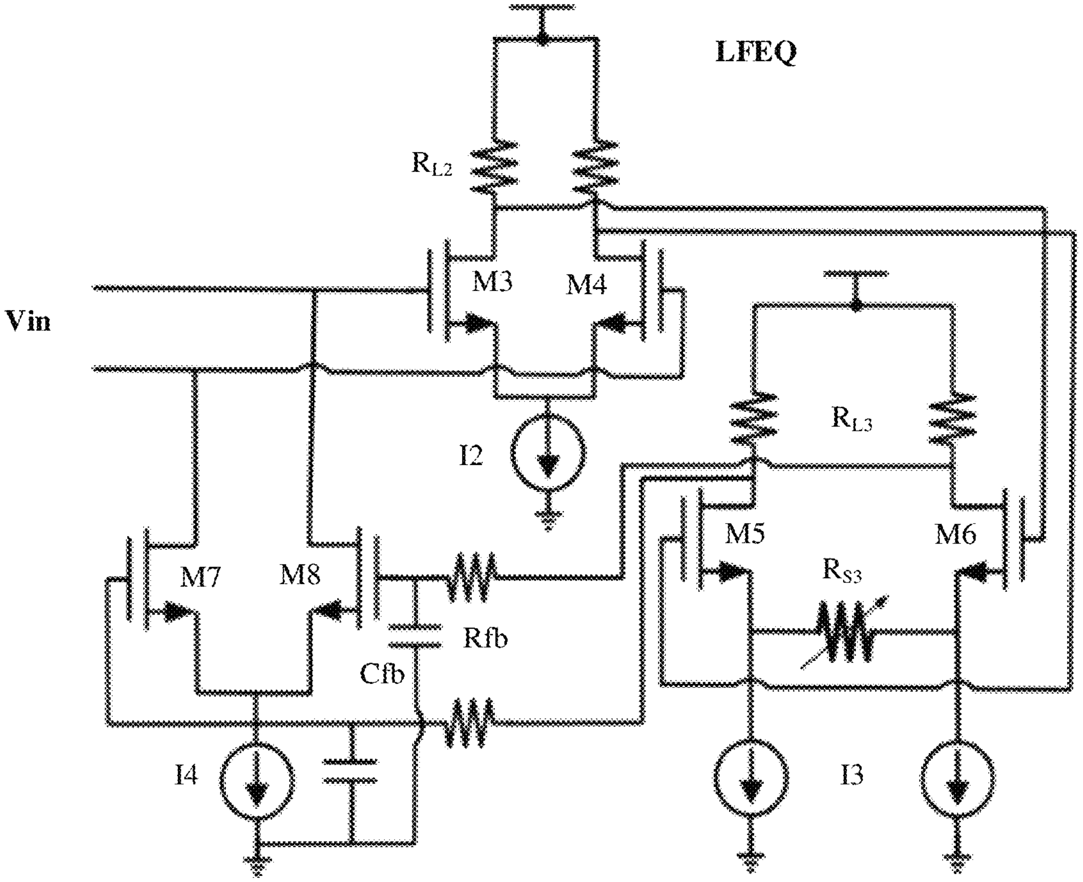
FIG. 13 is a schematic diagram of a circuit structure of an LFEQ according to an embodiment of this application.

The low frequency equalizer 1032 is configured to: receive the first electrical signal-B, compensate for a signal transmission loss of a low-frequency part (in other words, a low-frequency component) of the first electrical signal-B, to reduce inter-symbol interference of the low-frequency part of the first electrical signal-B to obtain a first electrical signal-C, and then send the first electrical signal-C to the level mismatch compensation circuit 1033. FIG. 13 is a schematic diagram of a circuit structure of an LFEQ according to an embodiment of this application. As shown in FIG. 13, the LFEQ may adjust, based on a negative feedback technology, a slope of a low-frequency loss part of a channel, and may further adjust a signal gain, to implement equalization control on a low-frequency part of a signal, thereby reducing inter-symbol interference of the low-frequency part of the signal. It should be understood that the circuit structure shown in FIG. 13 is merely an example. In some possible embodiments, the LFEQ circuit may include more or fewer components than those shown in FIG. 13. This is not specifically limited in this embodiment of this application.

Figure 14:
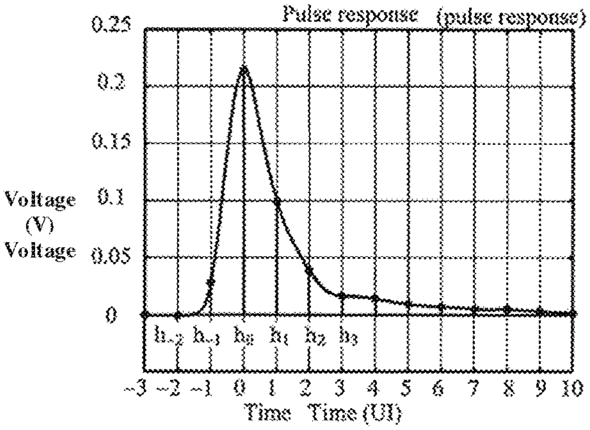
FIG. 14 is line graphs of a group of single bit responses according to an embodiment of this application.
Figure 14:
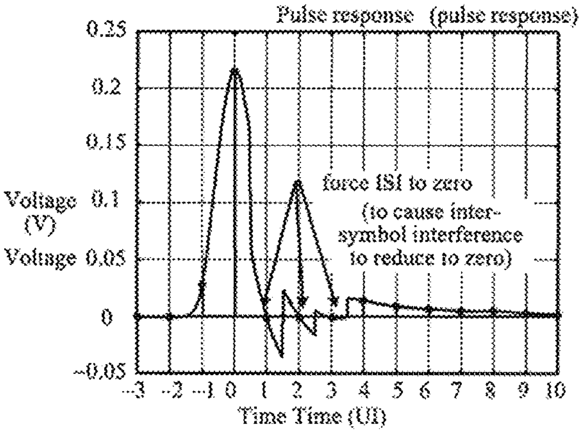

The level mismatch compensation circuit 1033 may include a decision feedback equalizer (DFE), and is configured to: receive the first electrical signal-C, compensate for a signal transmission loss of a high-frequency part of the first electrical signal-C by using the DFE, to reduce inter-symbol interference of the high-frequency part of the first electrical signal-C to obtain a first electrical signal-D, and then send the first electrical signal-D to the output amplification circuit 1034. Optionally, FIG. 14 is line graphs of a group of single bit responses according to an embodiment of this application. As shown in a single bit response (SBR) curve on a left side of FIG. 14, when there is no control of the DFE, after a signal transmission loss occurs on a signal, inter-symbol interference becomes severe. As shown in a single bit response (SBR) curve on a right side of FIG. 14, after three taps DFE, inter-symbol interference of a high-frequency part of the signal may tend to zero. This greatly reduces the inter-symbol interference of the high-frequency part of the signal, and ensures signal quality.

An output end of the output amplification circuit 1034 may be connected to a first optical/electrical converter 105, and is configured to: receive and amplify the first electrical signal-D to obtain a second electrical signal, and then send the second electrical signal to the first optical/electrical converter 105. Optionally, the output amplification circuit 1034 may further include a feed forward equalizer (FFE). As described above, considering a loss existing in a subsequent signal transmission process, the FFE may further perform pre-equalization processing on the first electrical signal-D, and properly attenuate a low-frequency part of the first electrical signal-D, to obtain the second electrical signal. As described above, after the pre-equalization processing, it can be ensured that an amplitude difference between a high-frequency part and a low-frequency part of an electrical signal subsequently received by another device becomes smaller, that is, it can be ensured that inter-symbol interference of the electrical signal received by the another device is small.

Figure 15:
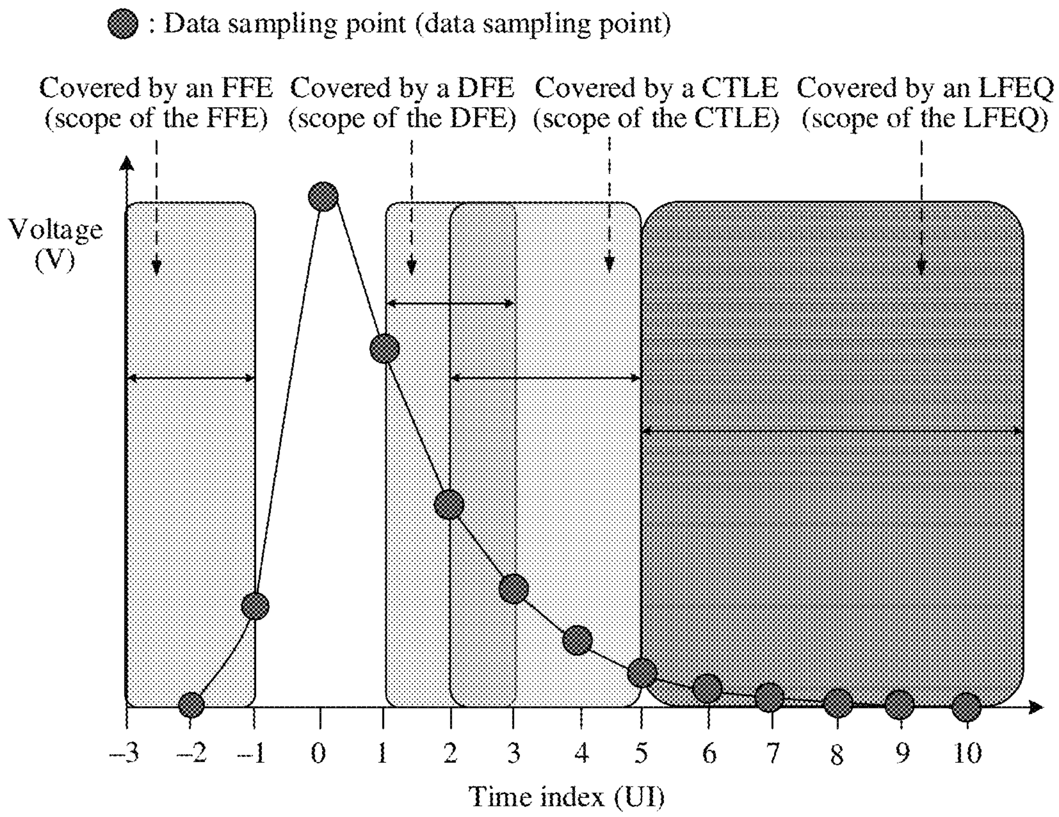
FIG. 15 is a schematic diagram of a time domain compensation range according to an embodiment of this application.

In conclusion, FIG. 15 is a schematic diagram of a time domain compensation range according to an embodiment of this application. As shown in FIG. 15, the continuous time linear equalizer 1031 is mainly configured to compensate for a loss of a high-frequency part of an electrical signal, to reduce inter-symbol interference of the high-frequency part of the electrical signal. The low frequency equalizer 1032 is mainly configured to compensate for a loss of a low-frequency part of an electrical signal, to reduce inter-symbol interference of the low-frequency part of the electrical signal. The DFE in the level mismatch compensation circuit 1033 is mainly configured to compensate for a loss of a high-frequency part of an electrical signal, to reduce inter-symbol interference of the high-frequency part of the electrical signal. The FFE in the output amplification circuit 1034 is mainly configured to attenuate a low-frequency part of a signal in advance before outputting a signal to another device, to reduce inter-symbol interference of a signal received by an equalizer in the another communication device. In this way, loss compensation in a full frequency band is jointly implemented by using the foregoing CTLE, LFEQ, DFE, and FFE, thereby reducing inter-symbol interference of the signal (in other words, reducing inter-symbol interference in a channel), and improving a signal noise ratio (SNR) of channel transmission. This effectively ensures signal transmission quality.

Second, because structures of the transmit equalizer 103*a* and the receive equalizer 103*b* are similar, a process in which the receive equalizer 103*b* performs analog signal equalization processing is briefly described below with reference to the structure of the receive equalizer 103*b* shown in FIG. 11.

A high-speed electrical signal (for example, a third electrical signal) output by a second optical/electrical converter 106 is first received and amplified by the input amplification circuit 1035 in the receive equalizer 103*b*, and then the amplified third electrical signal sequentially passes through the continuous time linear equalizer 1036, the low frequency equalizer 1037, and the level mismatch compensation circuit 1038, to respectively compensate a high-frequency part and a low-frequency part of the third electrical signal, thereby reducing inter-symbol interference of the third electrical signal. Finally, a high-speed electrical signal (for example, a fourth electrical signal) with better quality and less inter-symbol interference is output after the output amplification circuit 1039 performs amplification.

Optionally, for detailed descriptions of the receive equalizer 103*b*, refer to the descriptions of the transmit equalizer 103*a*. Details are not described herein again.

It should be understood that the structure shown in FIG. 11 is merely an example. In some possible embodiments, the transmit equalizer 103*a* and the receive equalizer 103*b* may alternatively include only some devices or circuits in FIG. 11. For example, the transmit equalizer 103*a* may include only the input amplification circuit 1030, the continuous time linear equalizer 1031, the level mismatch compensation circuit 1033, and the output amplification circuit 1034. Alternatively, the transmit equalizer 103*a* may include only the input amplification circuit 1030, the continuous time linear equalizer 1031, and the output amplification circuit 1034. Alternatively, the transmit equalizer 103*a* may include only the continuous time linear equalizer 1031, the low frequency equalizer 1032, and the level mismatch compensation circuit 1033. For another example, the receive equalizer 103*b* may include only the input amplification circuit 1035, the level mismatch compensation circuit 1038, and the output amplification circuit 1039. Alternatively, the receive equalizer 103*b* may include only the continuous time linear equalizer 1036, the low frequency equalizer 1037, the level mismatch compensation circuit 1038, and the like. This is not specifically limited in this embodiment of this application.

Figure 16:
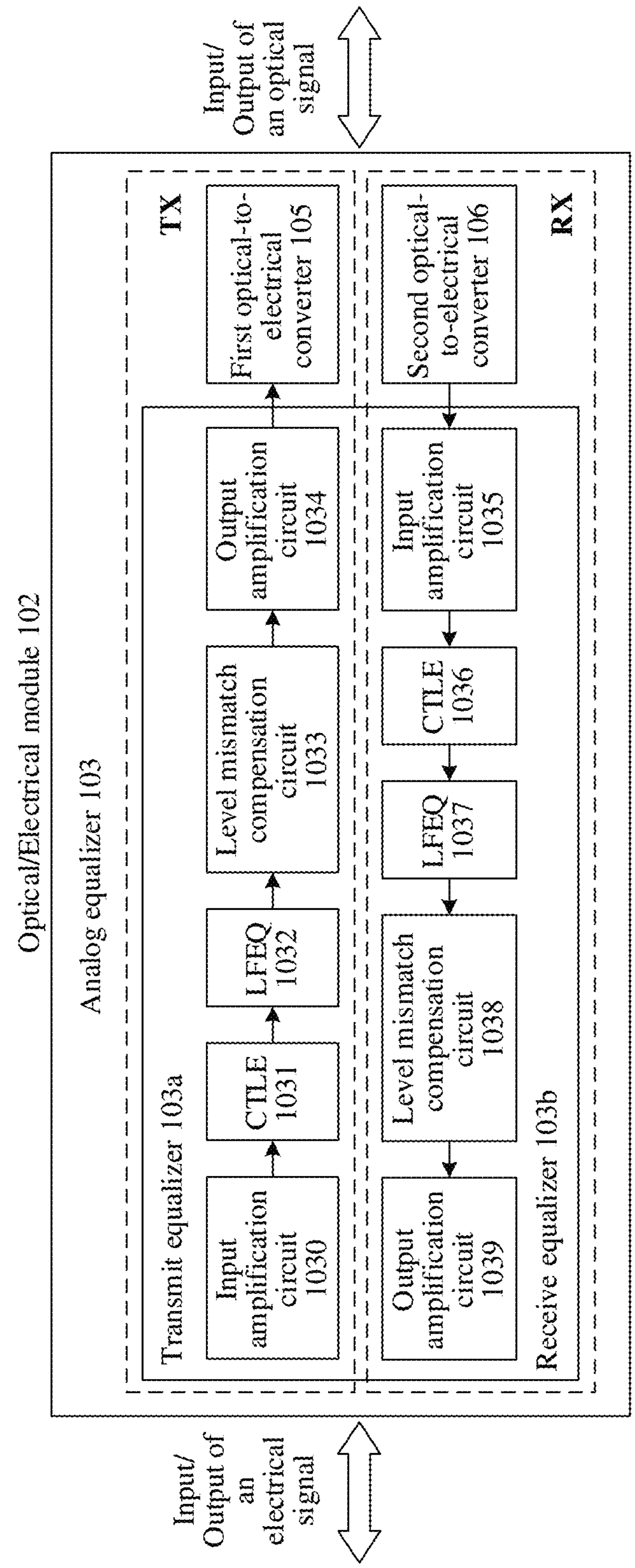
FIG. 16 is a schematic diagram of a structure of an optical/electrical module according to an embodiment of this application.

With reference to the analog equalizer 103 shown in FIG. 11, the following further describes in detail an optical/electrical module in embodiments of this application. FIG. 16 is a schematic diagram of a structure of an optical/electrical module according to an embodiment of this application. In FIG. 16, the optical/electrical module 102 in the communication device 10 shown in FIG. 8 or FIG. 9 is used as an example. It may be understood that the structure shown in FIG. 16 may be further used in an optical/electrical module 202 or an optical/electrical module in any other communication device. Details are not described herein again. As shown in FIG. 16, the optical/electrical module 102 may include a transmit channel (TX) and a receive channel (RX). Specifically, as shown in dashed-line boxes in FIG. 16, the TX may include a transmit equalizer 103*a* and a first optical/electrical converter 105, and the RX may include a receive equalizer 103*b* and a second optical/electrical converter 106. Both the TX and the RX mentioned in the following embodiments may use the foregoing structure. As shown in FIG. 16, one end of the optical/electrical module 102 is configured to input/output an electrical signal (for example, input a first electrical signal and output a fourth electrical signal), and the other end is configured to input/output an optical signal (for example, input a second optical signal and output a first optical signal). Details are not described herein again.

Figure 17:
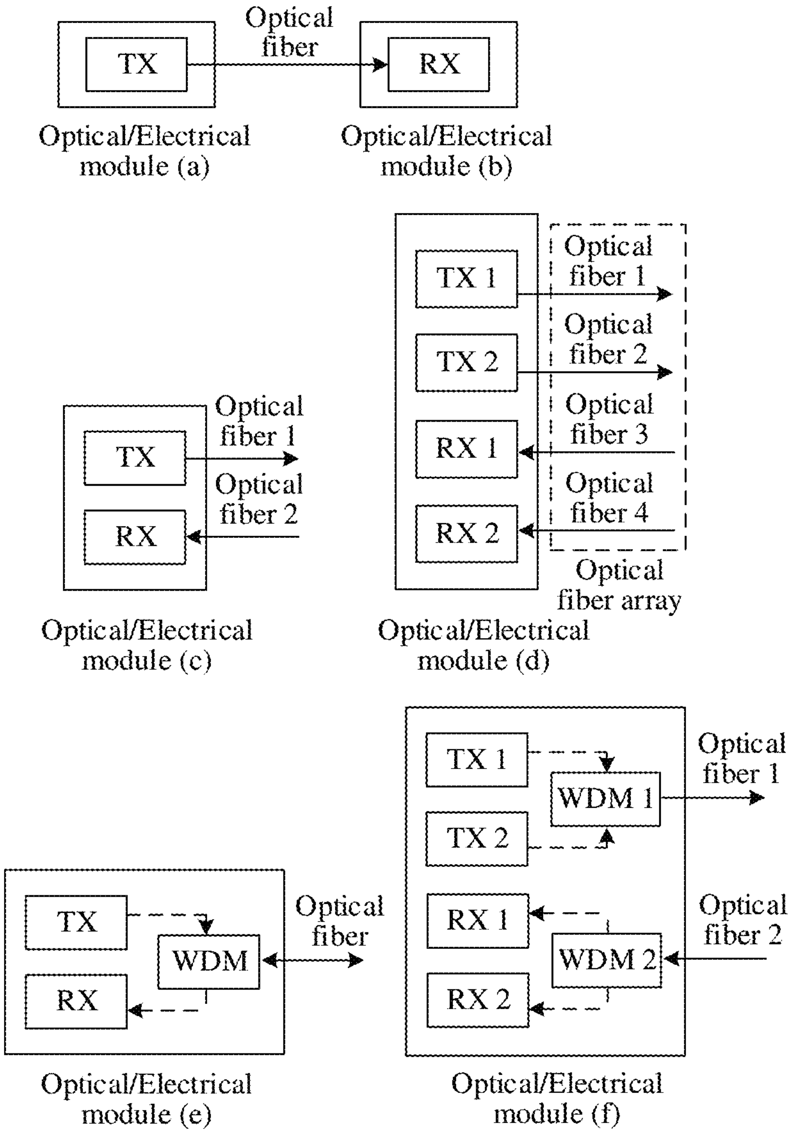
FIG. 17 is a schematic diagram of structures of a group of optical/electrical modules according to an embodiment of this application.

FIG. 17 is a schematic diagram of structures of a group of optical/electrical modules according to an embodiment of this application. As shown in FIG. 17, in an actual application, an optical/electrical module provided in this embodiment of this application may have various structures shown in an optical/electrical module (a), an optical/electrical module (b), an optical/electrical module (c), an optical/electrical module (d), an optical/electrical module (e), an optical/electrical module (f), and the like in FIG. 17, may have a combination of the foregoing structures, or may have any other possible structure. This is not specifically limited in this embodiment of this application. Optionally, an optical fiber (for example, including an optical fiber 1, an optical fiber 2, an optical fiber 3, and an optical fiber 4) shown in FIG. 17 may be a hollow-core optical fiber.

As shown in FIG. 17, the optical/electrical module (a) may be a sending module, and may include only one TX. The optical/electrical module (b) may be a receiving module, and may include only one RX. As shown in FIG. 17, the optical/electrical module (a) and the optical/electrical module (b) may be respectively disposed in two communication devices, and are connected through an optical fiber, to implement signal transmission from the optical/electrical module (a) to the optical/electrical module (b).

As shown in FIG. 17, the optical/electrical module (c) may be a single-channel transceiver module, and may include one TX and one RX. The TX is connected to an optical fiber 1, and is configured to: convert an electrical signal of a local device into an optical signal, and output the optical signal to another device through the optical fiber 1. The RX is connected to an optical fiber 2, and is configured to: receive, through the optical fiber 2, an optical signal sent by the another device, convert the optical signal into an electrical signal, and input the electrical signal to the local device.

As shown in FIG. 17, the optical/electrical module (d) may be a multi-channel parallel module, and may include a plurality of TXs (for example, a TX 1 and a TX 2) and a plurality of RXs (for example, an RX 1 and an RX 2). The TX 1 is connected to an optical fiber 1, and the TX 2 is connected to an optical fiber 2. The TX 1 and the TX 2 may be configured to: convert, in parallel, two lanes of electrical signals into two lanes of corresponding optical signals, and output the two lanes of optical signals to another device through the optical fiber 1 and the optical fiber 2. The RX 1 is connected to an optical fiber 3, and the RX 2 is connected to an optical fiber 4. The RX 1 and the RX 2 are configured to: receive, in parallel through the optical fiber 3 and the optical fiber 4, two lanes of optical signals sent by the another device, convert the two lanes of optical signals into two lanes of corresponding electrical signals, and input the two lanes of electrical signals to a local device.

As shown in FIG. 17, the optical/electrical module (e) may be a single-fiber bidirectional optical/electrical module, and may include one TX, one RX, and a wavelength division multiplexing component (WDM). The TX and the RX are separately connected to the WDM, and the WDM is connected to an optical fiber, so that both an optical signal sent by the TX and an optical signal received by the RX can be transmitted through the same piece of optical fiber by using the WDM.

As shown in FIG. 17, the optical/electrical module (f) may be a wavelength division multiplexing optical/electrical module, and may include a plurality of TXs (for example, a TX 1 and a TX 2), a plurality of RXs (for example, an RX 1 and an RX 2), and a plurality of WDMs (for example, a WDM 1 and a WDM 2). The TX 1 and the TX 2 are separately connected to the WDM 1, and then the WDM 1 is connected to an optical fiber 1, so that two lanes of optical signals output in parallel by the TX 1 and the TX 2 may be input to the optical fiber 1 after being multiplexed by using the WDM 1, and then output to another device through the optical fiber 1. The RX 1 and the RX 2 are separately connected to the WDM 2, and then the WDM 2 is connected to an optical fiber 2. The WDM 2 is configured to: receive and demultiplex a multiplexed signal from the optical fiber 2, and respectively input two lanes of optical signals obtained through demultiplexing to the RX 1 and the RX 2.

Figure 18:
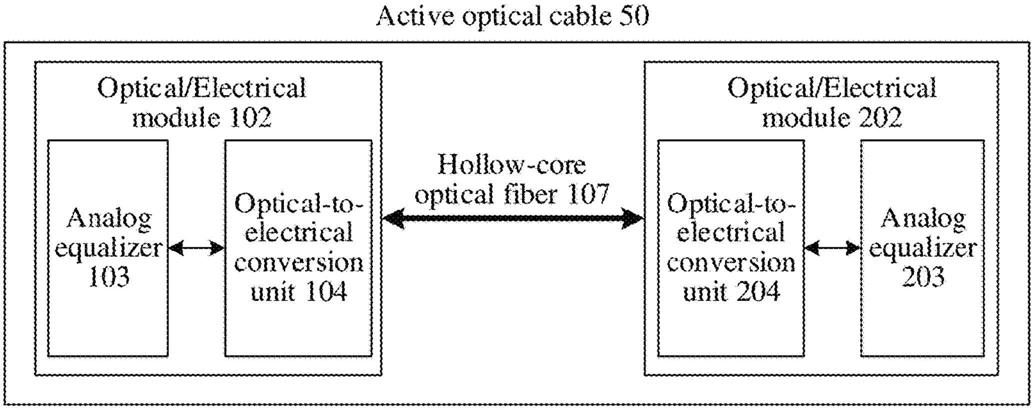
FIG. 18 is a schematic diagram of a structure of an active optical cable according to an embodiment of this application.

Further, based on the optical/electrical module described in the foregoing embodiment, an embodiment of this application further provides an active optical cable. FIG. 18 is a schematic diagram of a structure of an active optical cable according to an embodiment of this application. As shown in FIG. 18, the active optical cable 50 may include two optical/electrical modules (such as an optical/electrical module 102 and an optical/electrical module 202) and a hollow-core optical fiber 107 connecting the two optical/electrical modules. The optical/electrical module 102 and the optical/electrical module 202 may be directly coupled to two ends of the hollow-core optical fiber 107 (where for example, the optical/electrical module 102 may be directly coupled to one end of the hollow-core optical fiber 107, and the optical/electrical module 202 may be directly coupled to the other end of the hollow-core optical fiber 107), to reduce or even avoid an insertion loss at a joint between the optical/electrical module and the optical fiber. The optical/electrical module 102 may include an analog equalizer 103 (for example, including a transmit equalizer 103*a* and a receive equalizer 103*b*) and an optical/electrical conversion unit 104 (for example, including a first optical/electrical converter 105 and a second optical/electrical converter 106). Details are not described herein again. The optical/electrical module 202 may include an analog equalizer 203 (for example, including a transmit equalizer 203*a* and a receive equalizer 203*b*) and an optical/electrical conversion unit 204 (for example, including a first optical/electrical converter 205 and a second optical/electrical converter 206). Details are not described herein again. The hollow-core optical fiber 107 may include one or more pieces of hollow-core optical fibers, and each piece of hollow-core optical fiber may include at least one segment of hollow-core optical fiber or the like. Alternatively, in some possible embodiments, a solid-core optical fiber may be used in consideration of an actual requirement, costs, and the like. This is not specifically limited in this embodiment of this application.

Figure 19:
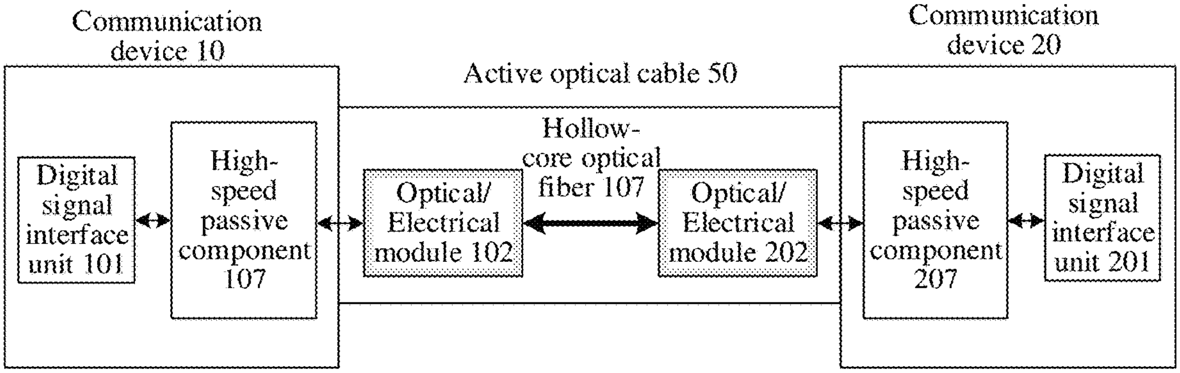
FIG. 19 is a schematic diagram of a structure of another communication system according to an embodiment of this application.

FIG. 19 is a schematic diagram of a structure of another communication system according to an embodiment of this application. As shown in FIG. 19, an active optical cable 50 may be used as a whole to connect two communication devices. For example, an optical/electrical module 102 in the active optical cable 50 may be connected to a high-speed passive component 107 in a communication device 10, and an optical/electrical module 202 in the active optical cable 50 may be connected to a high-speed passive component 207 in a communication device 20, to provide a high-speed and low-latency transmission channel for the communication device 10 and the communication device 20. For a detailed process of transmitting a signal by using the active optical cable 50, refer to the related descriptions in the embodiments corresponding to FIG. 8 to FIG. 11. Details are not described herein again.

Refer to FIG. 18 and FIG. 19. In a high-speed and low-latency active optical cable (AOC) provided in this embodiment of this application, two optical/electrical modules may be connected through one or more pieces of hollow-core optical fibers, and packaged and coupled into one integral component. In actual use, only two ends of the active optical cable need to be inserted into two devices, so that an effect similar to that of a network cable can be achieved. It is clear that compared with the foregoing solution in which the optical fiber needs to be inserted into the optical/electrical module in the device by using the adapter and in which an operation is complex, and an additional optical link loss (that is, insertion losses between two ends of the optical fiber and optical/electrical modules in two devices) is caused, the two optical/electrical modules in the active optical cable provided in this embodiment of this application may be directly coupled to the optical fiber, and the active optical cable may be used as an external whole to connect the two devices. This has advantages of ease of use and a low insertion loss. In addition, after the optical/electrical module is integrated into the active optical cable, the communication device 10 and the communication device 20 include only electrical signal transmission, and there is no optical signal conversion. In this way, signal transmission efficiency in the communication device can be greatly improved, and manufacturing costs of the communication device can be reduced. In addition, the communication device may be used in a scenario in all aspects such as electrical communication or optical/electrical communication based on connection selection of an optical cable or a cable.

Figure 20:
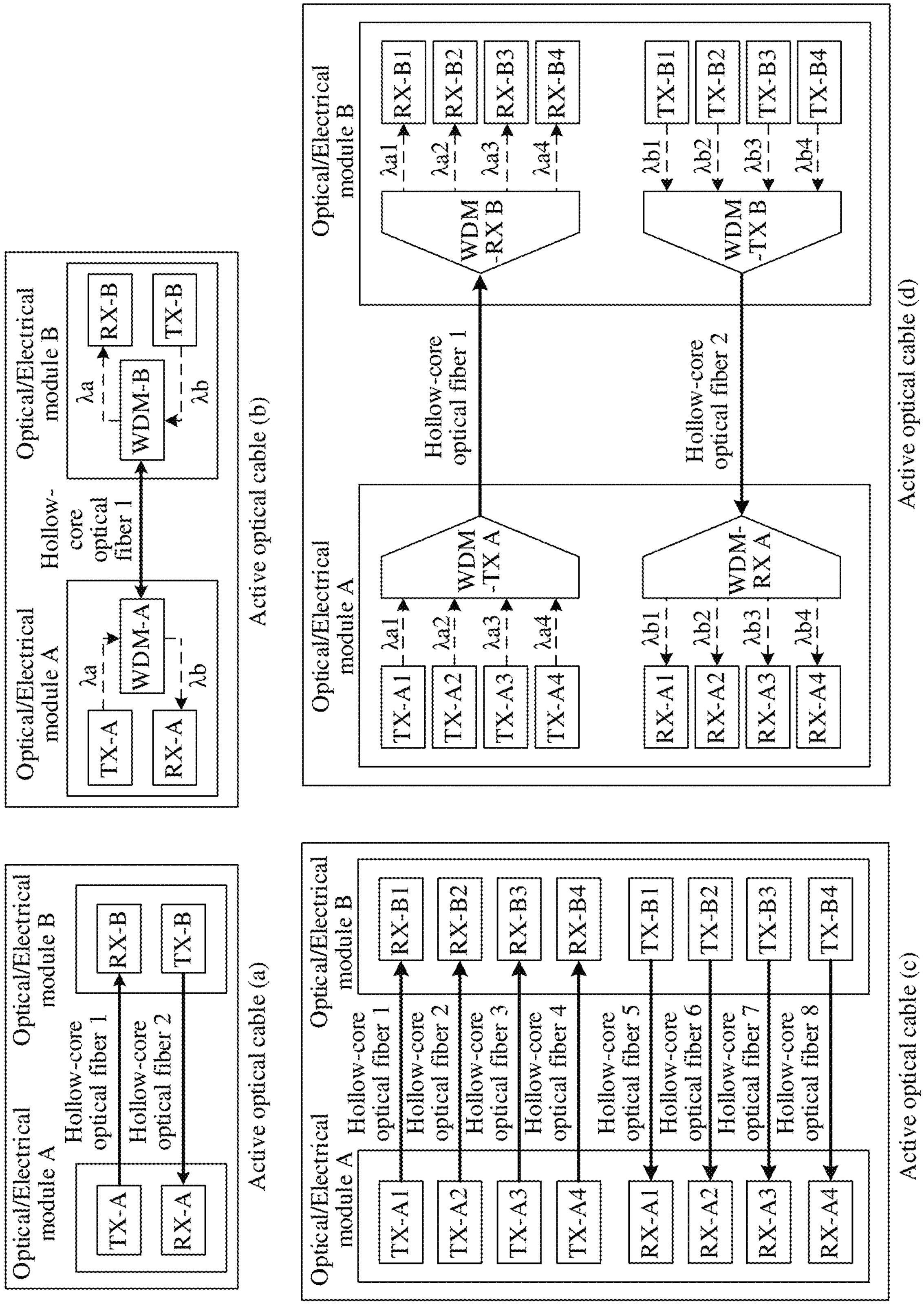
FIG. 20 is a schematic diagram of structures of a group of active optical cables according to an embodiment of this application.

Based on the various optical/electrical modules shown in FIG. 17 and the active optical cables shown in FIG. 18 and FIG. 19, an embodiment of this application further provides various corresponding active optical cables. FIG. 20 is a schematic diagram of structures of a group of active optical cables according to an embodiment of this application. As shown in FIG. 20, in an actual application, an optical/electrical module provided in this embodiment of this application may have various structures shown in an active optical cable (a), an active optical cable (b), an active optical cable (c), and an active optical cable (d) in FIG. 20, may have a combination of the foregoing structures, or may have any other possible structure. This is not specifically limited in this embodiment of this application.

As shown in FIG. 20, the active optical cable (a) may be a single-channel active optical cable, and may include an optical/electrical module A and an optical/electrical module B, where each of the optical/electrical module A and the optical/electrical module B includes a single lane of TX and RX. Specifically, as shown in FIG. 20, in the active optical cable (a), the optical/electrical module A includes a TX-A and an RX-A, and the optical/electrical module B includes a TX-B and an RX-B. As shown in FIG. 20, the active optical cable (a) may further include a hollow-core optical fiber 1 and a hollow-core optical fiber 2, respectively configured to connect the TX-A to the RX-B, and the RX-A to the TX-B.

As shown in FIG. 20, in the active optical cable (a), an optical signal output by the TX-A in the optical/electrical module A may be input to the RX-B in the optical/electrical module B through the hollow-core optical fiber 1. An optical signal output by the TX-B in the optical/electrical module B may be input to the RX-A in the optical/electrical module A through the hollow-core optical fiber 2. Details are not described herein again.

As shown in FIG. 20, the active optical cable (b) may be a single-fiber bidirectional active optical cable, and may include an optical/electrical module A and an optical/electrical module B, where each of the optical/electrical module A and the optical/electrical module B not only includes a single lane of TX and RX, but also respectively includes a wavelength division multiplexing component. Specifically, as shown in FIG. 20, in the active optical cable (b), the optical/electrical module A includes a TX-A, an RX-A, and a WDM-A, and the optical/electrical module B includes a TX-B, an RX-B, and a WDM-B. As shown in FIG. 20, the active optical cable (b) further includes a hollow-core optical fiber 1, configured to connect the optical/electrical module A to the optical/electrical module B, and specifically configured to connect the WDM-A to the WDM-B.

As shown in FIG. 20, in the active optical cable (b), generally, a wavelength of an optical signal output by the TX-A of the optical/electrical module A is different from a wavelength of an optical signal output by the TX-B of the optical/electrical module B, and the two wavelengths may be $\lambda a$ and $\lambda b$ respectively.

As shown in FIG. 20, in the active optical cable (b), after being multiplexed by the WDM-A, the $\lambda a$ optical signal output by the TX-A of the optical/electrical module A is input to the hollow-core optical fiber 1. Subsequently, the WDM-B of the optical/electrical module B receives the $\lambda a$ optical signal from the hollow-core optical fiber 1, and inputs the $\lambda a$ optical signal obtained through demultiplexing to the RX-B of the optical/electrical module B.

Correspondingly, after being multiplexed by the WDM-B, the $\lambda b$ optical signal output by the TX-B of the optical/electrical module B is input to the hollow-core optical fiber 1. Subsequently, the WDM-A of the optical/electrical module A receives the $\lambda b$ optical signal from the hollow-core optical fiber 1, and inputs the $\lambda b$ optical signal obtained through demultiplexing to the RX-A of the optical/electrical module A. Details are not described herein again.

As shown in FIG. 20, the active optical cable (c) may be a multi-channel active optical cable, and may include an optical/electrical module A and an optical/electrical module B, where each of the optical/electrical module A and the optical/electrical module B may include four lanes of TXs and RXs. Specifically, as shown in FIG. 20, in the active optical cable (c), the optical/electrical module A includes a TX-A1, a TX-A2, a TX-A3, and a TX-A4, and an RX-A1, an RX-A2, an RX-A3, and an RX-A4. The optical/electrical module B includes a TX-B1, a TX-B2, a TX-B3, a TX-B4, and an RX-B1, an RX-B2, an RX-B3, and an RX-B4.

As shown in FIG. 20, the active optical cable (c) further includes eight cores of hollow-core optical fibers, and specifically includes a hollow-core optical fiber 1, a hollow-core optical fiber 2, a hollow-core optical fiber 3, a hollow-core optical fiber 4, a hollow-core optical fiber 5, a hollow-core optical fiber 6, a hollow-core optical fiber 7, and a hollow-core optical fiber 8, respectively configured to connect the TX-A1 to the RX-B1, the TX-A2 to the RX-B2, the TX-A3 to the RX-B3, the TX-A4 to the RX-B4, the RX-A1 to the TX-B1, the RX-A2 to the TX-B2, the RX-A3 to the TX-B3, and the RX-A4 to the TX-B4.

As shown in FIG. 20, in the active optical cable (c), optical signals output by the TX-A1, the TX-A2, the TX-A3, and the TX-A4 of the optical/electrical module A are respectively input to the hollow-core optical fiber 1, the hollow-core optical fiber 2, the hollow-core optical fiber 3, and the hollow-core optical fiber 4. Subsequently, the RX-B1, the RX-B2, the RX-B3, and the RX-B4 of the optical/electrical module B respectively receive the optical signals from the hollow-core optical fiber 1, the hollow-core optical fiber 2, the hollow-core optical fiber 3, and the hollow-core optical fiber 4.

Correspondingly, in the active optical cable (c), optical signals output by the TX-B1, the TX-B2, the TX-B3, and the TX-B4 of the optical/electrical module B are respectively input to the hollow-core optical fiber 5, the hollow-core optical fiber 6, the hollow-core optical fiber 7, and the hollow-core optical fiber 8. Subsequently, the RX-A1, the RX-A2, the RX-A3, and the RX-A4 of the optical/electrical module A respectively receive the optical signals from the hollow-core optical fiber 5, the hollow-core optical fiber 6, the hollow-core optical fiber 7, and the hollow-core optical fiber 8.

It should be noted that, as shown in the active optical cable (c) in FIG. 20, a multi-channel active cable of four channels is used as an example. In an actual application, a quantity of channels of the multi-channel active cable may be any integer greater than or equal to 2. This is not specifically limited in this embodiment of this application. For example, there may be 2, 4, 6, 8, or 16 channels. Correspondingly, a quantity of cores (in other words, a quantity of pieces) of required hollow-core optical fibers may be 4, 8, 12, 16, or 32.

As shown in FIG. 20, the active optical cable (d) may be a wavelength division multiplexing active optical cable, and may include an optical/electrical module A and an optical/electrical module B, where each of the optical/electrical module A and the optical/electrical module B may include four lanes of TXs and RXs, and a WDM in a TX direction and a WDM in an RX direction. Specifically, as shown in FIG. 20, in the active optical cable (d), the optical/electrical module A includes a TX-A1, a TX-A2, a TX-A3, a TX-A4, and a WDM-TX A, and an RX-A1, an RX-A2, an RX-A3, an RX-A4, and a WDM-RX A. The optical/electrical module B includes a TX-B1, a TX-B2, a TX-B3, a TX-B4, and a WDM-TX B, and an RX-B1, an RX-B2, an RX-B3, an RX-B4, and a WDM-RX B.

As shown in FIG. 20, the active optical cable (d) further includes a hollow-core optical fiber 1, configured to connect the WDM-TX A in the optical/electrical module A to the WDM-RX B in the optical/electrical module B, and a hollow-core optical fiber 2, configured to connect the WDM-RX A in the optical/electrical module A to the WDM-TX B in the optical/electrical module B.

As shown in FIG. 20, in the active optical cable (d), generally, wavelengths of optical signals output by the four channels of TXs in the optical/electrical module A are different, and may be λa1, λa2, λa3, and λa4 respectively. Correspondingly, wavelengths of optical signals output by the four channels of TXs in the optical/electrical module B are also different, and may be λb1, λb2, λb3, and λb4 respectively.

As shown in FIG. 20, in the active optical cable (d), after being multiplexed by the WDM-TX A, the λa1 optical signal, the λa2 optical signal, the λa3 optical signal, and the λa4 optical signal that are respectively output by the TX-A1, the TX-A2, the TX-A3, and the TX-A4 of the optical/electrical module A are input to the hollow-core optical fiber 1. Subsequently, the WDM-RX B of the optical/electrical module B receives a multiplexed optical signal from the hollow-core optical fiber 1, and respectively inputs the λa1 optical signal, the λa2 optical signal, the λa3 optical signal, and the λa4 optical signal that are obtained through demultiplexing to the RX-B1, the RX-B2, the RX-B3, and the RX-B4 of the optical/electrical module B.

Correspondingly, after being multiplexed by the WDM-TX B, the λb1 optical signal, the λb2 optical signal, the λb3 optical signal, and the λb4 optical signal that are respectively output by the TX-B1, the TX-B2, the TX-B3, and the TX-B4 of the optical/electrical module B are input to the hollow-core optical fiber 2. Subsequently, the WDM-RX A of the optical/electrical module A receives a multiplexed optical signal from the hollow-core optical fiber 2, and respectively inputs the λb1 optical signal, the λb2 optical signal, the λb3 optical signal, and the λb4 optical signal that are obtained through demultiplexing to the RX-A1, the RX-A2, the RX-A3, and the RX-A4 of the optical/electrical module A. Details are not described herein again.

It should be noted that, as shown in the active optical cable (d) in FIG. 20, a 4-channel wavelength division multiplexing active cable is used as an example. In an actual application, a quantity of channels of the wavelength division multiplexing active optical cable may be any integer greater than or equal to 2. For example, there are 4, 6, 8, or 16 channels. Correspondingly, multiplexed optical signals with 4, 6, 8, or 16 wavelengths may be transmitted in the hollow-core optical fiber 1 and the hollow-core optical fiber 2. This is not specifically limited in this embodiment of this application. For example, a transmit channel of the optical/electrical module A may include a TX-A1, a TX-A2, a TX-A3, a TX-A4, a TX-A5, a TX-A6, a TX-A7, and a TX-A8, and a receive channel of the optical/electrical module A may include an RX-A1, an RX-A2, an RX-A3, an RX-A4, an RX-M, an RX-A6, an RX-A7, and an RX-A8. The same is true for the optical/electrical module B. Details are not described herein again.

Figure 21:
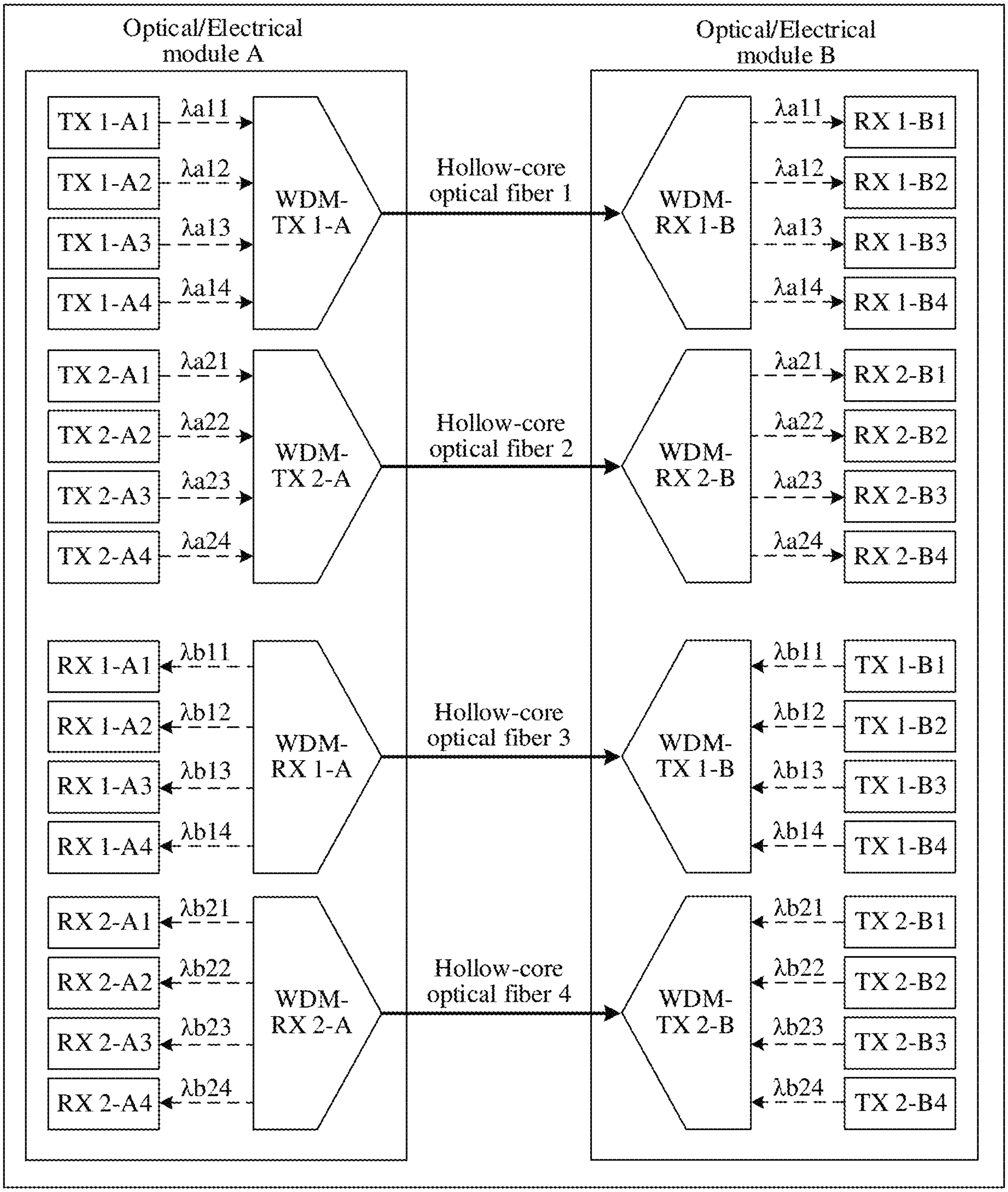
FIG. 21 is a schematic diagram of a structure of another active optical cable according to an embodiment of this application.

Based on the active optical cable (d) shown in FIG. 20, further, FIG. 21 is a schematic diagram of a structure of another active optical cable according to an embodiment of this application. As shown in FIG. 21, the active optical cable (e) may be a multi-channel parallel wavelength division multiplexing active optical cable, and has a more complex active optical cable structure.

As shown in FIG. 21, the active optical cable (e) includes an optical/electrical module A and an optical/electrical module B, where each of the optical/electrical module A and the optical/electrical module B includes two groups of four-channel wavelength division multiplexing as shown in the active optical cable (d). Specifically, as shown in FIG. 21, each of the optical/electrical module A and the optical/electrical module B includes eight channels of TXs, eight channels of RXs, and four corresponding wavelength division multiplexing components (such as a WDM-TX 1-A, a WDM-TX 2-A, a WDM-RX 1-A, and a WDM-RX 2-A, and a WDM-TX 1-B, a WDM-TX 2-B, a WDM-RX 1-B, and a WDM-RX 2-B). As shown in FIG. 21, the active optical cable (e) may further include a hollow-core optical fiber 1, a hollow-core optical fiber 2, a hollow-core optical fiber 3, and a hollow-core optical fiber 4, respectively configured to connect the WDM-TX 1-A to the WDM-RX 1-B, the WDM-TX 2-A to the WDM-RX 2-B, the WDM-RX 1-A to the WDM-TX 1-B, and the WDM-RX 2-A to the WDM-TX 2-B. Specifically, for detailed descriptions of the active optical cable (e), refer to the descriptions of the active optical cable (d) in FIG. 20. Details are not described herein again.

Optionally, as shown in the active optical cable (e) in FIG. 21, two groups of 4-channel parallel wavelength division multiplexing active optical cables are used as examples. In an actual application, the multi-channel parallel wavelength division multiplexing active optical cable may alternatively be four groups of 4-channel parallel wavelength division multiplexing active optical cables, four groups of 6-channel parallel wavelength division multiplexing active optical cables, six groups of 2-channel parallel wavelength division multiplexing active optical cables, or the like. In each group, interconnections may be performed through two cores of hollow-core optical fibers. This is not specifically limited in this embodiment of this application. For example, that there are four groups and there are four wavelengths (that is, four channels) in each group is used as an example. Each of the optical/electrical module A and the optical/electrical module B may include sixteen channels of TXs, sixteen channels of RXs, four WDMs in sending directions, and four WDMs in receiving directions, where wavelength division multiplexing/demultiplexing is performed on every four channels, and interconnections are performed through eight cores of hollow-core optical fibers. Details are not described herein again.

In conclusion, embodiments of this application provide an optical/electrical module. According to a method in which an analog equalizer is used in the optical/electrical module to replace an original CDR, equalization processing is directly performed on a received electrical signal in an analog domain, to reduce inter-symbol interference of the signal. It is clear that using the analog equalizer can directly avoid complex and time-consuming processes of operations such as digital logic processing and a plurality of times of serial-to-parallel conversion. In this way, a transmission latency of the signal in the optical/electrical module is greatly reduced while ensuring signal quality, thereby reducing computing waiting time of a device, and improving an overall computing capability.

In addition, in embodiments of this application, according to a method in which a high-speed passive component is used to replace an original relay CDR, in a scenario of transmitting a high-speed electrical signal, a signal transmission loss and a signal transmission latency of the signal between a digital signal interface unit and the optical/electrical module can be further reduced.

In addition, in embodiments of this application, according to a method in which a hollow-core optical fiber is used to replace an original solid-core optical fiber, a transmission latency of the signal in the optical fiber is further reduced. As described above, according to embodiments of this application, a transmission latency of transmitting a signal from one device to another device can be minimized while ensuring signal transmission quality. In short, it can be effectively ensured that a communication device in one communication system can receive a high-quality signal in extremely short time, so that a computing capability of the entire communication system can be greatly improved.

Further, based on the optical/electrical module provided in embodiments of this application, embodiments of this application further provide an active optical cable, where two optical/electrical modules may be directly coupled to two ends of the hollow-core optical fiber and packaged into a whole. In this way, compared with a solution of an original technology in which the optical/electrical module is located inside the communication device, and can be connected to the optical fiber only by using an adapter, causing a large insertion loss, the active optical cable provided in embodiments of this application can well reduce or even avoid an insertion loss between the optical/electrical module and the optical fiber. This is equivalent to that only a loss generated when an optical signal is transmitted inside the optical fiber may be left in an insertion loss of the optical signal. Therefore, signal transmission quality can be further ensured. In addition, in an actual application, only two ends of the active optical cable need to be respectively connected to two communication devices. This is convenient to operate.

Figure 22:
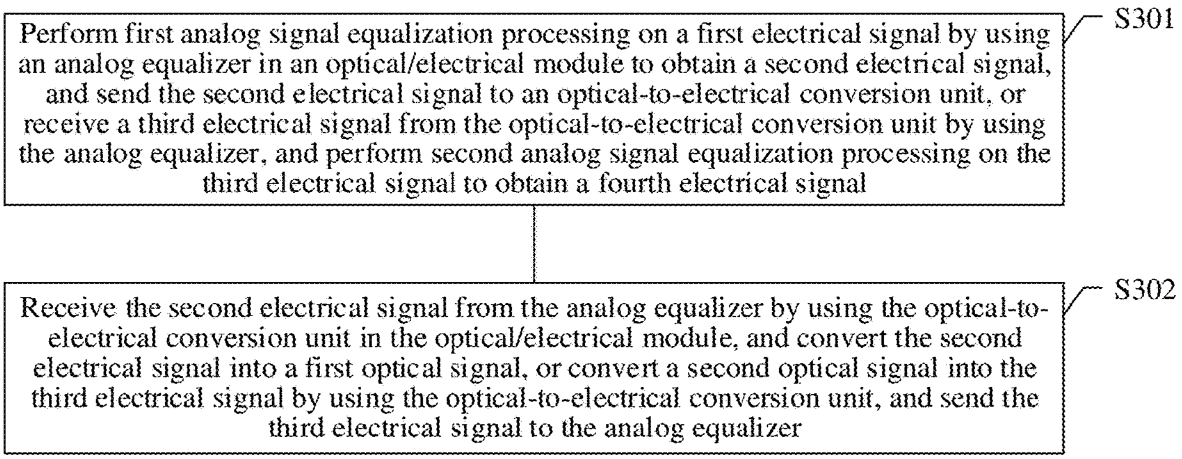
FIG. 22 is a schematic flowchart of a communication method in which an optical/electrical module is used according to an embodiment of this application.

FIG. 22 is a schematic flowchart of a communication method in which an optical/electrical module is used according to an embodiment of this application. The communication method may be applied to a communication device (for example, a communication device 10 and a communication device 20, such as any one of the switch, the server, the random access memory resource pool, and the storage resource pool in FIG. 6). The communication device may include an optical/electrical module, where the optical/electrical module includes an analog equalizer and an optical/electrical conversion unit, and the analog equalizer is connected to the optical/electrical conversion unit. Optionally, the communication method may be applied to the system architecture shown in FIG. 6 or a similar system architecture. The communication method may include the following step S301 and step S302.

Step S301: Perform first analog signal equalization processing on a first electrical signal by using the analog equalizer in the optical/electrical module to obtain a second electrical signal, and send the second electrical signal to the optical/electrical conversion unit, or receive a third electrical signal from the optical/electrical conversion unit by using the analog equalizer, and perform second analog signal equalization processing on the third electrical signal to obtain a fourth electrical signal. Step S302: Receive the second electrical signal from the analog equalizer by using the optical/electrical conversion unit in the optical/electrical module, and convert the second electrical signal into a first optical signal, or convert a second optical signal into the third electrical signal by using the optical/electrical conversion unit, and send the third electrical signal to the analog equalizer.

In some possible implementations, the method may specifically include: receiving the second electrical signal from the analog equalizer by using a first optical/electrical converter in the optical/electrical conversion unit and converting the second electrical signal into the first optical signal; and performing the first analog signal equalization processing on the first electrical signal by using a transmit equalizer in the analog equalizer to obtain the second electrical signal, and sending the second electrical signal to the first optical/electrical converter.

In some possible implementations, the method may specifically include: converting the second optical signal into the third electrical signal by using a second optical/electrical converter in the optical/electrical conversion unit and sending the third electrical signal to the analog equalizer; and receiving the third electrical signal from the second optical/electrical converter by using a receive equalizer in the analog equalizer, and performing the second analog signal equalization processing on the third electrical signal to obtain the fourth electrical signal.

Optionally, for details of the communication method in which the optical/electrical module is used, refer to the descriptions of the embodiments corresponding to FIG. 7 to FIG. it Details are not described herein again.

Optionally, each method procedure in the communication method in which the optical/electrical module is used and that is described in this embodiment of this application may be specifically implemented based on software, hardware, or a combination thereof. A hardware implementation may include a logic circuit, an algorithm circuit, an analog circuit, or the like. A software implementation may include program instructions. The program instructions may be considered as a software product, stored in a memory, and may be run by a processor to implement a related function.

An embodiment of this application further provides a computer-readable storage medium, where the computer-readable storage medium may store a program. When the program is executed by a processor, the processor is enabled to perform some or all steps recorded in any one of the foregoing method embodiments.

An embodiment of this application further provides a computer program, where the computer program includes instructions. When the computer program is executed by a multi-core processor, the processor is enabled to perform some or all steps recorded in any one of the foregoing method embodiments.

In the foregoing embodiments, the descriptions of the embodiments have respective focuses. For a part that is not described in detail in an embodiment, refer to related descriptions of another embodiment. It should be noted that, for brief description, the foregoing method embodiments are represented as a series of actions. However, persons skilled in the art should understand that this application is not limited to the described order of the actions, because according to this application, some steps may be performed in other orders or simultaneously. In addition, persons skilled in the art should further understand that embodiments described in this specification all belong to example embodiments, and the involved actions and modules are not necessarily required by this application.

In several embodiments provided in this application, it should be understood that the disclosed apparatus may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or another form.

The foregoing units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like, and may specifically be a processor in the computer device) to perform all or some of the steps of the methods described in embodiments of this application. The foregoing storage medium may include any medium that can store program code, such as a USB flash drive, a removable hard disk, a magnetic disk, an optical disc, a read-only memory (ROM), a double data rate synchronous dynamic random access memory (DDR), a flash, or a random access memory (RAM).

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions recorded in the foregoing embodiments or make equivalent replacements to some technical features thereof. Such modifications or replacements do not make the essence of the corresponding technical solutions depart from the spirit and the scope of the technical solutions of embodiments of this application.

What is claimed is:

1. An optical/electrical module, comprising:

an analog equalizer and an optical/electrical converter, wherein the analog equalizer is connected to the optical/electrical converter;

wherein the analog equalizer is configured to:

perform first analog signal equalization processing on a first electrical signal to obtain a second electrical signal, and send the second electrical signal to the optical/electrical converter, or receive a third electrical signal from the optical/electrical converter, and perform second analog signal equalization processing on the third electrical signal to obtain a fourth electrical signal;

wherein the analog equalizer comprises a continuous time linear equalizer (CTLE), a low frequency equalizer (LFEQ), and a level mismatch compensation circuit connected between the optical/electrical converter and one of an input end or an output end of the analog equalizer; and wherein the optical/electrical converter is configured to:

receive the second electrical signal from the analog equalizer and convert the second electrical signal into a first optical signal, or convert a second optical signal into the third electrical signal and send the third electrical signal to the analog equalizer.

2. The optical/electrical module according to claim 1, wherein the optical/electrical converter comprises a first optical/electrical converter, configured to receive the second electrical signal from the analog equalizer and convert the second electrical signal into the first optical signal; and wherein the analog equalizer comprises a transmit equalizer, configured to: perform the first analog signal equalization processing on the first electrical signal to obtain the second electrical signal, and send the second electrical signal to the first optical/electrical converter.

3. The optical/electrical module according to claim 2, wherein the transmit equalizer comprises a first CTLE, a first LFEQ, and a first level mismatch compensation circuit.

4. The optical/electrical module according to claim 3, wherein the transmit equalizer comprises the first CTLE, the first LFEQ, and the first level mismatch compensation circuit that are connected in series.

5. The optical/electrical module according to claim 1, wherein the optical/electrical converter comprises a second optical/electrical converter, configured to: convert the second optical signal into the third electrical signal and send the third electrical signal to the analog equalizer; and wherein the analog equalizer comprises a receive equalizer, configured to: receive the third electrical signal from the second optical/electrical converter, and perform the second analog signal equalization processing on the third electrical signal to obtain the fourth electrical signal.

6. The optical/electrical module according to claim 5, wherein the receive equalizer comprises a second CTLE, a second LFEQ, and a second level mismatch compensation circuit.

7. The optical/electrical module according to claim 6, wherein the receive equalizer comprises the second CTLE, the second LFEQ, and the second level mismatch compensation circuit that are connected in series.

8. A device, comprising:

a digital signal interface;

an optical/electrical module, comprising an analog equalizer and an optical/electrical converter, wherein the analog equalizer is connected to the optical/electrical converter; and a high-speed passive component comprising a high-speed cable connected between the digital signal interface and the analog equalizer;

wherein the analog equalizer is configured to:

perform first analog signal equalization processing on a first electrical signal to obtain a second electrical signal, and send the second electrical signal to the optical/electrical converter; or receive a third electrical signal from the optical/electrical converter, and perform second analog signal equalization processing on the third electrical signal to obtain a fourth electrical signal; and wherein the optical/electrical converter is configured to:

receive the second electrical signal from the analog equalizer and convert the second electrical signal into a first optical signal, or convert a second optical signal into the third electrical signal and send the third electrical signal to the analog equalizer; and wherein the digital signal interface is configured to:

receive a first digital electrical signal from a processing device, convert the first digital electrical signal into the first electrical signal, and send the first electrical signal to the analog equalizer, or receive the fourth electrical signal from the analog equalizer, convert the fourth electrical signal into a second digital electrical signal, and send the second digital electrical signal to the processing device.

9. The device according to claim 8, wherein the high-speed passive component comprises a first high-speed connector, a second high-speed connector, and the high-speed cable, wherein the first high-speed connector and the second high-speed connector are connected through the high-speed cable, wherein the first high-speed connector is connected to the digital signal interface, and wherein the second high-speed connector is connected to the analog equalizer.

10. The device according to claim 8, wherein the high-speed passive component comprises a first high-speed connector, and wherein the first high-speed connector is connected between the digital signal interface and the analog equalizer; and wherein the high-speed cable comprises a first hollow-core optical fiber and wherein the device further comprises a hollow-core optical fiber connector;

wherein the first hollow-core optical fiber is connected to the optical/electrical converter, and is configured to send the first optical signal or receive the second optical signal; and wherein the hollow-core optical fiber connector is configured to send the first optical signal to a second hollow-core optical fiber or receive the second optical signal from the second hollow-core optical fiber.

11. An active optical cable, comprising:

at least two optical/electrical modules; and a hollow-core optical fiber;

wherein each optical/electrical module comprises an analog equalizer and an optical/electrical converter, wherein the analog equalizer of each optical/electrical module is connected to the corresponding optical/electrical converter;

wherein the analog equalizer of each optical/electrical module is configured to:

perform first analog signal equalization processing on a first electrical signal to obtain a second electrical signal, and send the second electrical signal to the corresponding optical/electrical converter; or receive a third electrical signal from the corresponding optical/electrical converter, and perform second analog signal equalization processing on the third electrical signal to obtain a fourth electrical signal;

wherein the analog equalizer of at least one optical/electrical module comprises a continuous time linear equalizer (CTLE), a low frequency equalizer (LFEQ), and a level mismatch compensation circuit connected between the optical/electrical converter and one of an input end or an output end of the analog equalizer; and wherein the optical/electrical converter of each optical/electrical module is configured to:

receive the second electrical signal from the corresponding analog equalizer and convert the second electrical signal into a first optical signal, or convert a second optical signal into the third electrical signal and send the third electrical signal to the corresponding analog equalizer; and wherein the at least two optical/electrical modules are connected through the hollow-core optical fiber.

12. A communication system, comprising a plurality of communication devices, wherein the plurality of communication devices are connected through the active optical cable according to claim 11.

13. A method in which an optical/electrical module is used, comprising:

performing first analog signal equalization processing on a first electrical signal by using an analog equalizer in the optical/electrical module to obtain a second electrical signal, wherein the analog equalizer comprises a continuous time linear equalizer (CTLE), a low frequency equalizer (LFEQ), and a level mismatch compensation circuit connected between an optical/electrical converter and one of an input end or an output end of the analog equalizer;

performing:

sending the second electrical signal to the optical/electrical converter, or receiving a third electrical signal from the optical/electrical converter by using the analog equalizer, and performing second analog signal equalization processing on the third electrical signal to obtain a fourth electrical signal; and receiving the second electrical signal from the analog equalizer by using the optical/electrical converter in the optical/electrical module; and performing:

converting the second electrical signal into a first optical signal; or converting a second optical signal into the third electrical signal by using the optical/electrical converter, and sending the third electrical signal to the analog equalizer.

* * * * *